(12) United States Patent
Fukaya

(10) Patent No.: US 12,007,535 B2
(45) Date of Patent: Jun. 11, 2024

(54) IMAGING LENS COMPRISING SEVEN LENSES OF +−+−−+− or +++−−+− REFRACTIVE POWERS

(71) Applicant: TOKYO VISIONARY OPTICS CO., LTD., Tokyo (JP)

(72) Inventor: Hisao Fukaya, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 203 days.

(21) Appl. No.: 17/391,852

(22) Filed: Aug. 2, 2021

(65) Prior Publication Data

US 2021/0364763 A1 Nov. 25, 2021

Related U.S. Application Data

(63) Continuation of application No. 16/660,306, filed on Oct. 22, 2019, now Pat. No. 11,262,546.

(30) Foreign Application Priority Data

Oct. 23, 2018 (JP) .................... 2018-199085

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS

| | | |
|---|---|---|
| 2017/0227734 A1 | 8/2017 | Huang |
| 2019/0331882 A1* | 10/2019 | Shi ..................... G02B 13/0045 |
| 2019/0377161 A1 | 12/2019 | Lin et al. |

* cited by examiner

*Primary Examiner* — Wen Huang
(74) *Attorney, Agent, or Firm* — Maine Cernota & Curran

(57) ABSTRACT

There is provided an imaging lens with excellent optical characteristics which satisfies demand of a wide field of view, a low profile and a low F-number. An imaging lens comprises, in order from an object side to an image side, a first lens with positive refractive power in a paraxial region, a second lens, a third lens having an image-side surface being convex in the paraxial region, a fourth lens, a fifth lens with negative refractive power in the paraxial region, a sixth lens with positive refractive power in the paraxial region, and a seventh lens with negative refractive power having an image-side surface that is concave in the paraxial region and is formed as an aspheric surface having at least one pole point in a position off the optical axis.

6 Claims, 11 Drawing Sheets

IMAGING LENS COMPRISING SEVEN LENSES OF +−+−−+− or +++−−+− REFRACTIVE POWERS

The present application is based on and claims priority of a Japanese patent application No. 2018-199085 filed on Oct. 23, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in Patent Document 1 below have been known.

Patent Document 1 (US2017/0227734A) discloses an imaging lens comprising, in order from an object side, a first lens, a second lens, a third lens, a fourth lens, a fifth lens, a sixth lens and a seventh lens wherein the first lens has positive refractive power and a convex object-side surface in a paraxial region, the second lens has negative refractive power, at least one of an object-side surface and an image-side surface is an aspheric surface having an inflection point, and the seventh lens is a double-sided aspheric lens.

SUMMARY OF THE INVENTION

However, in lens configurations disclosed in the Patent Document 1, when a wide field of view, a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low profile and the low F-number in well balance and excellently corrects aberrations.

Regarding terms used in the present invention, "a convex surface", "a concave surface" or "a plane surface" of lens surfaces implies that a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power in a paraxial region, a second lens, a third lens having an image-side surface being convex in the paraxial region, a fourth lens, a fifth lens with negative refractive power in the paraxial region, a sixth lens with positive refractive power in the paraxial region, and a seventh lens with negative refractive power having an image-side surface that is concave in the paraxial region and is formed as an aspheric surface having at least one pole point in a position off the optical axis.

The imaging lens having the above-described configuration comprises a first lens group including the first lens and the second lens, a second lens group including the third lens and the fourth lens, and a third lens group including the fifth lens to the seventh lens. The first lens group has positive composite refractive power, achieves reduction in a profile of the imaging lens and corrects spherical aberration and axial chromatic aberration. The second lens group corrects the spherical aberration and the axial chromatic aberration that are not sufficiently corrected by the first group and an off-axial aberration. The third lens group corrects the off-axial aberration and controls a light ray incident angle to the image sensor.

The first lens achieves reduction in the profile of the imaging lens by the positive refractive power.

The second lens corrects the spherical aberration and axial chromatic aberration.

When the third lens has the image-side surface being concave in the paraxial region, the third lens corrects the spherical aberration and the axial chromatic aberration that are not sufficiently corrected by the second lens and coma aberration and astigmatism.

The fourth lens corrects the spherical aberration, the coma aberration and the astigmatism.

The fifth lens corrects the coma aberration, the astigmatism and distortion by the negative refractive power.

The sixth lens achieves reduction in the profile of the imaging lens by the positive refractive power and corrects the coma aberration and the astigmatism.

When the image-side surface of the seventh lens is concave in the paraxial region and is formed as the aspheric surface having at least one pole point in a position off the optical axis, the astigmatism and the distortion are corrected and the light ray incident angle to the image sensor is controlled.

According to the imaging lens having the above-described configuration, it is preferable that the first lens has a meniscus shape having an object-side surface being convex in the paraxial region.

When the first lens has the meniscus shape having the object-side surface being convex in the paraxial region, the spherical aberration can be suppressed while achieving reduction in the profile of the imaging lens.

According to the imaging lens having the above-described configuration, it is preferable that the second lens has a meniscus shape having an object-side surface being convex in the paraxial region.

When the second lens has the meniscus shape having the object-side surface being convex in the paraxial region, the spherical aberration and the axial chromatic aberration can be properly corrected.

According to the imaging lens having the above-described configuration, it is preferable that the third lens has positive refractive power in the paraxial region, and more preferable that the third lens has an object-side surface being convex in the paraxial region When the refractive power of the third lens is positive in the paraxial region, achieving reduction in the profile of the imaging lens is facilitated.

When the object-side surface of the third lens is convex in the paraxial region, that is, the third lens is formed in a biconvex shape in the paraxial region, the positive refractive power becomes large and achieving reduction in the profile of the imaging lens is more facilitated. Furthermore, curvatures on both sides of the object side and the image side are suppressed from being large, and sensitivity to a manufacturing error can be reduced. In addition, correction of the spherical aberration, coma aberration and the astigmatism is facilitated.

According to the imaging lens having the above-described configuration, it is preferable that the fourth lens has negative refractive power in the paraxial region, and more preferable that the fourth lens has an object-side surface being concave in the paraxial region.

When the refractive power of the fourth lens is negative in the paraxial region, the spherical aberration, the coma aberration and the astigmatism can be properly corrected.

When the object-side surface of the fourth lens is concave in the paraxial region, aberrations occurring at the convex image-side surface of the third lens can be compensated in a well balance.

According to the imaging lens having the above-described configuration, it is preferable that an object-side surface of the fifth lens is convex in the paraxial region and is formed as the aspheric surface having at least one pole point in a position off the optical axis.

When the object-side surface of the fifth lens is convex in the paraxial region and is formed as the aspheric surface having at least one pole point in the position off the optical axis, the coma aberration, the astigmatism and the distortion can be properly corrected.

According to the imaging lens having the above-described configuration, it is preferable that an image-side surface of the fifth lens is concave in the paraxial region and is formed as the aspheric surface having at least one pole point in a position off the optical axis.

When the image-side surface of the fifth lens is concave in the paraxial region and is formed as the aspheric surface having at least one pole point in the position off the optical axis, the astigmatism and the distortion can be properly corrected.

According to the imaging lens having the above-described configuration, it is preferable that an object-side surface of the sixth lens is convex in the paraxial region and is formed as the aspheric surface having at least one pole point in the position off the optical axis.

When the object-side surface of the sixth lens is convex in the paraxial region and is formed as the aspheric surface having at least one pole point in the position off the optical axis, the astigmatism can be properly corrected.

According to the imaging lens having the above-described configuration, it is preferable that an image-side surface of the sixth lens is convex in the paraxial region.

When the image-side surface of the sixth lens is convex in the paraxial region, the astigmatism and the distortion can be properly corrected.

According to the imaging lens having the above-described configuration, it is preferable that an object-side surface of the seventh lens is concave in the paraxial region.

When the object-side surface of the seventh lens is concave in the paraxial region, the astigmatism and the distortion can be properly corrected.

Regarding the imaging lens according to the present embodiments, it is preferable that all lenses of the first lens to the seventh lens are single lenses.

When all lenses are the single lenses respectively, all lens surfaces can be formed as appropriate aspheric surfaces and aberrations can be more properly corrected.

According to the imaging lens having the above-described configuration, it is preferable that the following conditional expression (1) is satisfied:

$$1.8 < vd3/vd4 < 4.0 \tag{1}$$

where
vd3: an abbe number at d-ray of the third lens, and
vd4: an abbe number at d-ray of the fourth lens.

The conditional expression (1) defines a relationship between the abbe numbers at d-ray of the third lens and the fourth lens. By using a material satisfying the conditional expression (1), the axial chromatic aberration and chromatic aberration of magnification can be properly corrected.

According to the imaging lens having the above-described configuration, it is preferable that the following conditional expression (2) is satisfied:

$$0.80 < T2/T3 < 15.0 \tag{2}$$

where
T2: a distance along the optical axis from an image-side surface of the second lens to an object-side surface of the third lens, and
T3: a distance along the optical axis from an image-side surface of the third lens to an object-side surface of the fourth lens.

The conditional expression (2) defines an appropriate range of a distance between the second lens and the third lens and a distance between the third lens and the fourth lens. By satisfying the conditional expression (2), the spherical aberration, the coma aberration, the astigmatism and the distortion can be corrected in a well balance, while maintaining reduction in the profile.

According to the imaging lens having the above-described configuration, it is preferable that the following conditional expression (3) is satisfied:

$$0.70 < \Sigma d/f < 1.30 \tag{3}$$

where
$\Sigma d$: a distance along the optical axis from an object-side surface of the first lens to an image-side surface of the seventh lens, and
f: a focal length of the overall optical system of the imaging lens.

The conditional expression (3) defines a relationship between the distance along the optical axis from the first lens to the seventh lens and the focal length. By satisfying the conditional expression (3), an appropriate back focus can be secured while maintaining the low profile of the imaging lens.

According to the imaging lens having the above-described configuration, it is preferable that the following conditional expression (4) is satisfied:

$$6.0 < (D6/TTL) \times 100 < 13.0 \tag{4}$$

where
D6: a thickness of the sixth lens along the optical axis, and
TTL: a total track length.

The conditional expression (4) defines an appropriate range of the thickness of the sixth lens along the optical axis. When a value is below the upper limit of the conditional expression (4), the thickness of the sixth lens along the optical axis is suppressed from being too large, and reduction in the profile becomes more facilitated. On the other hand, when the value is above the lower limit of the conditional expression (4), the thickness of the sixth lens along the optical axis is prevented from being too small, and the formability of the lens becomes excellent.

According to the imaging lens having the above-described configuration, it is preferable that the following conditional expression (5) is satisfied:

$$0.30 < r1/f < 0.60 \quad (5)$$

where r1: a paraxial curvature radius of an object-side surface of the first lens, and f: a focal length of the overall optical system of the imaging lens.

The conditional expression (5) defines a shape of the object-side surface of the first lens in the paraxial region. By satisfying the conditional expression (5), the spherical aberration is prevented from occurring excessively and reduction in the profile is achieved.

According to the imaging lens having the above-described configuration, it is preferable that the following conditional expression (6) is satisfied:

$$0.30 < r14/f < 1.20 \quad (6)$$

where r14: a paraxial curvature radius of an image-side surface of the seventh lens, and f: a focal length of the overall optical system of the imaging lens.

The conditional expression (6) defines a shape of the image-side surface of the seventh lens in the paraxial region. By satisfying the conditional expression (6), the formability of the lens is maintained excellently and control of the light ray incident angle to the image sensor becomes facilitated.

According to the imaging lens having the above-described configuration, it is preferable that the following conditional expression (7) is satisfied:

$$0.50 < r3/r4 < 2.50 \quad (7)$$

where r3: paraxial curvature radius of an object-side surface of the second lens, and r4: paraxial curvature radius of an image-side surface of the second lens.

The conditional expression (7) defines an appropriate range of paraxial curvature radii of the object-side surface and the image-side surface of the second lens. By satisfying the conditional expression (7), the spherical aberration and the axial chromatic aberration can be properly corrected.

According to the imaging lens having the above-described configuration, it is preferable that the following conditional expression (8) is satisfied:

$$r5/r6 < -0.30 \quad (8)$$

where r5: paraxial curvature radius of an object-side surface of the third lens, and r6: paraxial curvature radius of an image-side surface of the third lens.

The conditional expression (8) defines an appropriate range of paraxial curvature radii of the object-side surface and the image-side surface of the third lens. By satisfying the conditional expression (8), the distortion, the coma aberration and the astigmatism are suppressed and excellent optical performance can be maintained.

According to the imaging lens having the above-described configuration, it is preferable that the following conditional expression (9) is satisfied:

$$0.75 < r9/r10 < 6.40 \quad (9)$$

where r9: paraxial curvature radius of an object-side surface of the fifth lens, and r10: paraxial curvature radius of an image-side surface of the fifth lens.

The conditional expression (9) defines an appropriate range of paraxial curvature radii of the object-side surface and the image-side surface of the fifth lens. By satisfying the conditional expression (9), the coma aberration, the astigmatism and the distortion are properly corrected.

According to the imaging lens having the above-described configuration, it is preferable that the following conditional expression (10) is satisfied:

$$-1.50 < r11/r12 < -0.45 \quad (10)$$

where r11: paraxial curvature radius of an object-side surface of the sixth lens, and r12: paraxial curvature radius of an image-side surface of the sixth lens.

The conditional expression (10) defines an appropriate range of paraxial curvature radii of the object-side surface and the image-side surface of the sixth lens. By satisfying the conditional expression (10), the astigmatism and the distortion are properly corrected.

When the refractive power of the first lens is positive, it is preferable that the following conditional expression (11) is satisfied:

$$0.65 < f1/f < 1.75 \quad (11)$$

where f1: a focal length of the first lens, and f: a focal length of the overall optical system of the imaging lens.

The conditional expression (11) defines an appropriate range of the refractive power of the first lens. When the value is above the lower limit of the conditional expression (11), the total track length can be shortened and achieving reduction in the profile of the imaging lens is facilitated. On the other hand, when the value is above the lower limit of the conditional expression (11), the excellent optical performance can be maintained.

According to the imaging lens having the above-described configuration, the it is preferable that the following conditional expression (12) is satisfied:

$$0.75 < f3/f < 3.40 \quad (12)$$

where f3: a focal length of the third lens, and f: a focal length of the overall optical system of the imaging lens.

The conditional expression (12) defines an appropriate range of the refractive power of the third lens. By satisfying the conditional expression (12), the spherical aberration, the coma aberration and the astigmatism can be properly corrected.

According to the imaging lens having the above-described configuration, the it is preferable that the following conditional expression (13) is satisfied:

$$-3.30 < f4/f < -0.70 \quad (13)$$

where f4: a focal length of the fourth lens, and f: a focal length of the overall optical system of the imaging lens.

The conditional expression (13) defines an appropriate range of the refractive power of the fourth lens. By satisfying the conditional expression (13), the spherical aberration, the coma aberration and the astigmatism can be properly corrected.

According to the imaging lens having the above-described configuration, the it is preferable that the following conditional expression (14) is satisfied:

$$-30.0 < f5/f < -0.70 \tag{14}$$

where f5: a focal length of the fifth lens, and f: a focal length of the overall optical system of the imaging lens.

The conditional expression (14) defines an appropriate range of the refractive power of the fifth lens. By satisfying the conditional expression (14), the coma aberration, the astigmatism and the distortion can be properly corrected.

According to the imaging lens having the above-described configuration, the it is preferable that the following conditional expression (15) is satisfied:

$$0.30 < f6/f < 0.75 \tag{15}$$

where f6: a focal length of the sixth lens, and f: a focal length of the overall optical system of the imaging lens.

The conditional expression (15) defines an appropriate range of the refractive power of the sixth lens. By satisfying the conditional expression (15), the coma aberration and the astigmatism can be corrected in a well balance while maintaining the low profile of the imaging lens.

According to the imaging lens having the above-described configuration, the it is preferable that the following conditional expression (16) is satisfied:

$$-0.70 < f7/f < -0.35 \tag{16}$$

where f7: a focal length of the seventh lens, and f: a focal length of the overall optical system of the imaging lens.

The conditional expression (16) defines an appropriate range of the refractive power of the seventh lens. By satisfying the conditional expression (16), the appropriate back focus can be secured while suppressing the astigmatism and the distortion. Furthermore, the light ray incident angle to the image sensor can be appropriately controlled.

According to the imaging lens having the above-described configuration, the it is preferable that the following conditional expression (17) is satisfied:

$$0.80 < f12/f < 2.30 \tag{17}$$

where f12: a composite focal length of the first lens and the second lens, and f: a focal length of the overall optical system of the imaging lens.

The conditional expression (17) defines an appropriate range of the composite refractive power of the first lens and the second lens. By satisfying the conditional expression (17), the spherical aberration can be prevented from occurring excessively while achieving reduction in the profile of the imaging lens.

According to the imaging lens having the above-described configuration, it is preferable that the following conditional expression (18) is satisfied:

$$0.05 < D5/f < 0.13 \tag{18}$$

where

D5: a thickness of the fifth lens along the optical axis, and f: a focal length of the overall optical system of the imaging lens.

The conditional expression (18) defines an appropriate range of the thickness of the fifth lens along the optical axis. When a value is below the upper limit of the conditional expression (18), the thickness of the fifth lens along the optical axis is suppressed from being too large, and achieving reduction in the profile is more facilitated. On the other hand, when the value is above the lower limit of the conditional expression (18), the thickness of the fifth lens along the optical axis is suppressed from being too small, and the formability of the lens becomes excellent.

According to the imaging lens having the above-described configuration, it is preferable that the following conditional expression (19) is satisfied:

$$0.05 < T6/f < 0.15 \tag{19}$$

where

T6: a distance along the optical axis from an image-side surface of the sixth lens to an object-side surface of the seventh lens, and f: a focal length of the overall optical system of the imaging lens.

The conditional expression (19) defines an appropriate range of the distance between the sixth lens and the seventh lens. By satisfying the conditional expression (19), the astigmatism can be properly corrected while maintaining the low profile of the imaging lens.

According to the imaging lens having the above-described configuration, it is preferable that the following conditional expression (20) is satisfied:

$$8.5 < (D1/TTL) \times 100 < 22.0 \tag{20}$$

where

D1: a thickness of the first lens along the optical axis, and

TTL: a total track length.

The conditional expression (20) defines an appropriate range of the thickness of the first lens along the optical axis. When a value is below the upper limit of the conditional expression (20), the thickness of the first lens along the optical axis is prevented from being too large, and reduction in the profile becomes more facilitated. On the other hand, when the value is above the lower limit of the conditional expression (20), the spherical aberration is suppressed and excellent optical performance can be maintained, and the thickness of the first lens along the optical axis is prevented from being too small and the formability of the lens becomes excellent.

According to the imaging lens having the above-described configuration, it is preferable that the following conditional expression (21) is satisfied:

$$0.04 < T1/T2 < 0.80 \tag{21}$$

where

T1: a distance along the optical axis from an image-side surface of the first lens to an object-side surface of the second lens, and T2: a distance along the optical axis from an image-side surface of the second lens to an object-side surface of the third lens.

The conditional expression (21) defines an appropriate range of a distance between the first lens and the second lens and a distance between the second lens and the third lens. By satisfying the conditional expression (21), an appropriate distance can be secured and the spherical aberration can be properly corrected.

According to the imaging lens having the above-described configuration, it is preferable that the following conditional expression (22) is satisfied:

$$0.07<T3/T4<1.20 \qquad (22)$$

where
T3: a distance along the optical axis from an image-side surface of the third lens to an object-side surface of the fourth lens, and
T4: a distance along the optical axis from an image-side surface of the fourth lens to an object-side surface of the fifth lens.

The conditional expression (22) defines an appropriate range of a distance between the third lens and the fourth lens and a distance between the fourth lens and the fifth lens. By satisfying the conditional expression (22), the appropriate distance can be secured and the astigmatism and the distortion can be properly corrected.

According to the imaging lens having the above-described configuration, it is preferable that the following conditional expression (23) is satisfied:

$$r1/r2 \qquad (23)$$

where
r1: paraxial curvature radius of an object-side surface of the first lens, and
r2: paraxial curvature radius of an image-side surface of the first lens.

The conditional expression (23) defines an appropriate range of paraxial curvature radii of the object-side surface and the image-side surface of the first lens. By satisfying the conditional expression (23), reduction in the profile of the imaging lens can be achieved while suppressing occurrence of the spherical aberration.

According to the imaging lens having the above-described configuration, it is preferable that the following below conditional expression (24) is satisfied:

$$-1.70<f6/f7<-0.50 \qquad (24)$$

where
f6: a focal length of the sixth lens, and
f7: a focal length of the seventh lens.

The conditional expression (24) defines an appropriate range of a relationship between the focal length of the sixth lens and the focal length of the seventh lens. When a value is below the upper limit of the conditional expression (24), the light ray incident angle to the image sensor can be appropriately controlled. On the other hand, when the value is above the lower limit of the conditional expression (24), the astigmatism and the distortion can be properly corrected.

According to the imaging lens having the above-described configuration, it is preferable that the following conditional expression (25) is satisfied:

$$0<|Sag3F-Sag4R|/f<0.20 \qquad (25)$$

where
Sag3F: an amount of sag at a peripheral area of an effective diameter on an object-side surface of the third lens,
Sag4R: an amount of sag at a peripheral area of an effective diameter on an image-side surface of the fourth lens, and
f: a focal length of the overall optical system of the imaging lens.

The Conditional expression (25) defines a relationship between amounts of sag at the peripheral areas of the effective diameters on the object-side surface of the third lens and the image-side surface of the fourth lens. When a value is below the upper limit of the conditional expression (25), the coma aberration and the astigmatism can be properly corrected. On the other hand, when the value is above the lower limit of the conditional expression (25), correction of the spherical aberration becomes facilitated and the excellent optical performance can be maintained.

According to the imaging lens having the above-described configuration, it is preferable that the following conditional expression (26) is satisfied:

$$TTL/EPD \le 2.2 \qquad (26)$$

where
TTL: a total track length, and.
EPD: an entrance pupil diameter.

The conditional expression (26) defines a relationship between the total track length and the entrance pupil diameter. By satisfying the conditional expression (26), the total track length can be shortened, decrease in light quantity at the peripheral area can be suppressed and an image having sufficient brightness from a center to a peripheral area can be obtained.

According to the imaging lens having the above-described configuration, it is preferable that the following conditional expression (27) is satisfied:

$$TTL/ih<1.8 \qquad (27)$$

where
TTL: a total track length, and
Ih: a maximum image height.

The conditional expression (27) defines an appropriate range of a ratio of the total track length to the maximum image height. By satisfying the conditional expression (27), the imaging lens that profile is satisfactorily reduced can be obtained.

Effect of Invention

According to the present invention, there can be provided an imaging lens with high resolution which satisfies demand of the wide field of view, the low profile and the low F-number in a well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11 and 13 are schematic views of the imaging lenses in Examples 1 to 7 according to the embodiments of the present invention, respectively.

Figure 1:
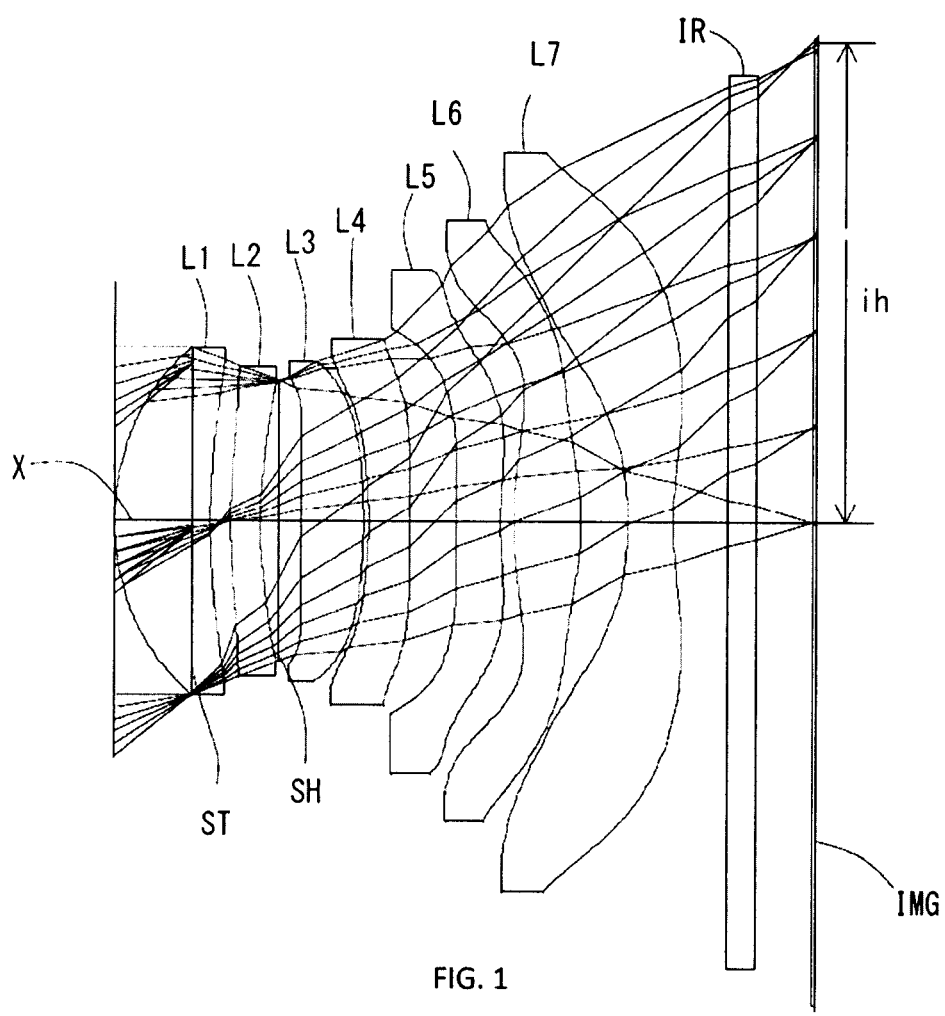
FIG. 1 is a schematic view showing an imaging lens in Example 1 according to the present invention.

As shown in FIG. 1, the imaging lens according to the present embodiment comprises, in order from an object side to an image side, a first lens L1 with positive refractive power in a paraxial region, a second lens L2, a third lens L3 having an image-side surface being convex in a paraxial region, a fourth lens L4, a fifth lens L5 with negative refractive power in the paraxial region, a sixth lens L6 with positive refractive power in the paraxial region, and a seventh lens L7 with negative refractive power in the paraxial region having an image-side surface that is concave in the paraxial region and is formed as an aspheric surface having at least one pole point in a position off the optical axis X.

A filter IR such as an IR cut filter and a cover glass are arranged between the seventh lens L7 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power in the paraxial region. The first lens is formed in a meniscus shape having an object-side surface being convex and an image-side surface being concave in the paraxial region. Therefore, spherical aberration is suppressed while achieving reduction in a profile of the imaging lens.

The second lens L2 has the negative refractive power in the paraxial region. The second lens L2 is formed in a meniscus shape having an object-side surface being convex and an image-side surface being concave in the paraxial region. Therefore, the spherical aberration and axial chromatic aberration can be properly corrected.

The refractive power of the second lens L2 may be positive in the paraxial region as in the Examples 4 and 5. In this case, load of the positive refractive power of the first lens can be reduced and the spherical aberration occurring at the first lens L1 can be suppressed.

The third lens L3 has positive refractive power in the paraxial region. The third lens L3 is formed in a biconvex shape having an object-side surface and an image-side surface being convex in the paraxial region. Therefore, reduction in the profile of the imaging lens can be achieved while reducing sensitivity to a manufacturing error.

The fourth lens L4 has negative refractive power in the paraxial region. The fourth lens L4 is formed in a meniscus shape having an object-side surface being concave and an image-side surface being convex in the paraxial region. Therefore, the spherical aberration, coma aberration and astigmatism can be properly corrected.

The fourth lens L4 may have an object-side surface being concave in the paraxial region, and an image-side surface may be concave in the paraxial region as in the Examples 2, 5 and 7. When the object-side surface is concave in the paraxial region, aberrations occurring at the convex image-side surface of the third lens L3 can be compensated in a well balance.

The fifth lens L5 has negative refractive power in the paraxial region. The fifth lens L5 is formed in a shape having an object-side surface being convex and an image-side surface being concave in the paraxial region. Furthermore, aspheric surfaces having at least one pole point are formed on both sides. Therefore, the coma aberration, the astigmatism and the distortion can be properly corrected.

The sixth lens L6 has positive refractive power in the paraxial region. The sixth lens L6 is formed in a shape having an object-side surface and an image-side surface being both convex in the paraxial region. Furthermore, aspheric surfaces are formed on the both sides, and the object-side surface has at least one pole point. Therefore, reduction in the profile of the imaging lens can be achieved while reducing the sensitivity to a manufacturing error, and the astigmatism and the distortion can be properly corrected.

The seventh lens L7 has negative refractive power in the paraxial region. The seventh fifth L7 is formed in a shape having an object-side surface and an image-side surface being both concave in the paraxial region. Furthermore, aspheric surfaces are formed on the both sides, and the image-side surface has at least one pole point. Therefore, the astigmatism and the distortion can be properly corrected and a light ray incident angle to the image sensor can be properly controlled.

Regarding the imaging lens according to the present embodiments, all lenses of the first lens L1 to the seventh lens L7 are single lenses. All lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

Furthermore, regarding the imaging lens according to the present embodiments, a flare stop SH is arranged between the second lens L2 and the third lens L3 other than the aperture stop ST. Thereby, the coma aberration can be suppressed by shielding a part of a light ray around a maximum image height, and the low F-number of about 1.46 to 1.72 is achieved and excellent optical performance can be obtained.

A position that the flare stop SH is arranged is not limited to an interval between the second lens L2 and the third lens L3. The flare stop SH is omissible in accordance with required performance.

The imaging lens according to the present embodiments shows preferable effect by satisfying the following conditional expressions (1) to (27).

$$1.8 < vd3/vd4 < 4.0 \tag{1}$$

$$0.80 < T2/T3 < 15.0 \tag{2}$$

$$0.70 < \Sigma d/f < 1.30 \tag{3}$$

$$6.0 < (D6/TTL) \times 100 < 13.0 \tag{4}$$

$$0.30 < r1/f < 0.60 \tag{5}$$

$$0.30 < r14/f < 1.20 \tag{6}$$

$$0.50 < r3/r4 < 2.50 \tag{7}$$

$$r5/r6 < -0.30 \tag{8}$$

$$0.75 < r9/r10 < 6.40 \tag{9}$$

$$-1.50 < r11/r12 < -0.45 \tag{10}$$

$$0.65 < f1/f < 1.75 \tag{11}$$

$$0.75 < f3/f < 3.40 \tag{12}$$

$$-3.30 < f4/f < -0.70 \tag{13}$$

$$-30.0 < f5/f < -0.70 \tag{14}$$

$$0.30 < f6/f < 0.75 \tag{15}$$

$$-0.70 < f7/f < -0.35 \tag{16}$$

$$0.80 < f12/f < 2.30 \tag{17}$$

$$0.05 < D5/f < 0.13 \tag{18}$$

$$0.05 < T6/f < 0.15 \tag{19}$$

$$8.5 < (D1/TTL) \times 100 < 22.0 \tag{20}$$

$$0.04 < T1/T2 < 0.80 \tag{21}$$

$$0.07 < T3/T4 < 1.20 \tag{22}$$

$$r1/r2 \tag{23}$$

$$-1.70 < f6/f7 < -0.50 \tag{24}$$

$$0 < |Sag3F - Sag4R|/f < 0.20 \tag{25}$$

$$TTL/EPD \le 2.4 \tag{26}$$

$$TTL/ih < 1.8 \tag{27}$$

where
f: a focal length of the overall optical system of the imaging lens,
f1: a focal length of the first lens L1,
f3: a focal length of the third lens L3,
f4: a focal length of the fourth lens L4,
f5: a focal length of the fifth lens L5,
f6: a focal length of the sixth lens L6,
f7: a focal length of the seventh lens L7,
f12: a composite focal length of the first lens L1 and the second lens L2,
Sag3F: an amount of sag at a peripheral area of an effective diameter on an object-side surface of the third lens,
Sag4R: an amount of sag at a peripheral area of an effective diameter on an image-side surface of the fourth lens,
r1: a paraxial curvature radius of an object-side surface of the first lens L1,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r5: a paraxial curvature radius of an object-side surface of the third lens L3,
r6: a paraxial curvature radius of an image-side surface of the third lens L3,
r9: a paraxial curvature radius of an object-side surface of the fifth lens L5,
r10: a paraxial curvature radius of an image-side surface of the fifth lens L5,
r11: a paraxial curvature radius of an object-side surface of the sixth lens L6,
r12: a paraxial curvature radius of an image-side surface of the sixth lens L6,
r14: a paraxial curvature radius of an image-side surface of the seventh lens L7,
T1: a distance along the optical axis X from an image-side surface of the first lens L1 to an object-side surface of the second lens L2,
T2: a distance along the optical axis X from an image-side surface of the second lens L2 T3: a distance along the optical axis X from an image-side surface of the third lens L3 to an object-side surface of the fourth lens L4,
T4: a distance along the optical axis X from an image-side surface of the fourth lens L4 to an object-side surface of the fifth lens L5,
T6: a distance along the optical axis X from an image-side surface of the sixth lens L6 to an object-side surface of the seventh lens L7, to an object-side surface of the third lens L3,
D1: a thickness along the optical axis X of the first lens L1,
D5: a thickness along the optical axis X of the fifth lens L5,
D6: a thickness along the optical axis X of the sixth lens L6,
Σd: a distance along the optical axis X from an object-side surface of the first lens L1 to an image-side surface of the seventh lens L7,
vd3: an abbe number at d-ray of the third lens L3,
vd4: an abbe number at d-ray of the fourth lens L4,
TTL: a total track length,
EPD: an entrance pupil diameter, and
Ih: a maximum image height.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (27a).

$$2.4 < vd3/vd4 < 3.2 \tag{1a}$$

$$1.1 < T2/T3 < 13.0 \tag{2a}$$

$$0.80 < \Sigma d/f < 1.10 \tag{3a}$$

$8.0 < (D6/TTL) \times 100 < 11.0$ (4a)

$0.35 < r1/f < 0.55$ (5a)

$0.35 < r14/f < 1.10$ (6a)

$0.65 < r3/r4 < 2.00$ (7a)

$r5/r6 < -0.35$ (8a)

$0.90 < r9/r10 < 5.50$ (9a)

$-1.35 < r11/r12 < -0.55$ (10a)

$0.75 < f1/f < 1.60$ (11a)

$0.85 < f3/f < 3.10$ (12a)

$-3.00 < f4/f < -0.80$ (13a)

$-20.0 < f5/f < -0.90$ (14a)

$0.35 < f6/f < 0.70$ (15a)

$-0.65 < f7/f < -0.40$ (16a)

$0.90 < f12/f < 2.00$ (17a)

$0.05 < D5/f < 0.10$ (18a)

$0.05 < T6/f < 0.12$ (19a)

$10.0 < (D1/TTL) \times 100 < 20.0$ (20a)

$0.05 < T1/T2 < 0.70$ (21a)

$0.07 < T3/T4 < 1.00$ (22a)

$r1/r2$ (23a)

$-1.40 < f6/f7 < -0.70$ (24a)

$0 < |Sag3F - Sag4R|/f < 0.10$ (25a)

$TTL/EPD \leq 2.2$ (26a)

$TTL/ih < 1.65$ (27a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes paraxial curvature radius, k denotes a conic constant, and A4, A6, A8, A10, A12, A14 and A16 denote aspheric surface coefficients.

[Equation 1]

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from the object side, r denotes the paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
|---|
| Unit mm |
| f = 4.29 |
| Fno = 1.68 |
| ω(°) = 39.2 |
| ih = 3.53 |
| TTL = 5.14 |

Surface Data

| i | r | d | Nd | vd |
|---|---|---|---|---|
| (Object) | Infinity | Infinity | | |
| 1 (Stop) | Infinity | -0.5700 | | |
| 2* | 1.7722 | 0.7075 | 1.544 | 55.57 (vd1) |
| 3* | 4.4891 | 0.1507 | | |
| 4* | 3.5194 | 0.2200 | 1.671 | 19.24 (vd2) |
| 5* | 2.9991 | 0.1452 | | |
| 6 | Infinity | 0.1585 | | |
| 7* | 17.9963 | 0.4663 | 1.544 | 55.57 (vd3) |
| 8* | -3.3723 | 0.0366 | | |
| 9* | -3.6699 | 0.3141 | 1.671 | 19.24 (vd4) |
| 10* | -30.6966 | 0.3371 | | |
| 11* | 12.3026 | 0.3297 | 1.671 | 19.24 (vd5) |
| 12* | 2.5131 | 0.0965 | | |
| 13* | 2.5264 | 0.5020 | 1.639 | 23.52 (vd6) |
| 14* | -2.0546 | 0.3514 | | |
| 15* | -2.4118 | 0.3349 | 1.607 | 28.92 (vd7) |
| 16* | 2.6446 | 0.4000 | | |

TABLE 1-continued

Example 1

| | | | | |
|---|---|---|---|---|
| 17 | Infinity | 0.2100 | 1.517 | 64.20 |
| 18 | Infinity | 0.4227 | | |
| Image Plane | | | | |

Constituent Lens Data

| Lens | Start Surface | Focal Length | | | | Sag at Peripheral Area of Effective Diameter |
|---|---|---|---|---|---|---|
| 1 | 2 | 4.932 | | Composite | Sag3F | −0.091 |
| 2 | 4 | −36.427 | | Focal Length | Sag4R | −0.200 |
| 3 | 7 | 5.263 | f12 | 5.377 | | |
| 4 | 9 | −6.244 | | Entrance | | |
| 5 | 11 | −4.773 | | Pupil Diameter | | |
| 6 | 13 | 1.852 | EPD | 2.560 | | |
| 7 | 15 | −2.027 | | | | |

Aspheric Surface Data

| | Second Surface | Third Surface | Fourth Surface | Fifth Surface | Seventh Surface | Eighth Surface | Ninth Surface |
|---|---|---|---|---|---|---|---|
| k | −6.595094E−01 | 1.149482E+01 | 7.049543E+00 | −2.342974E+01 | −1.719363E+01 | 6.229244E+00 | 4.334190E+00 |
| A4 | 1.886365E−02 | −7.196310E−02 | −1.600507E−01 | −3.217768E−03 | −1.911947E−02 | 2.048442E−01 | 1.608275E−01 |
| A6 | −9.818221E−05 | 4.915023E−02 | 4.213952E−02 | −4.041426E−02 | −4.515265E−02 | −5.555174E−01 | −5.693229E−01 |
| A8 | 9.844447E−03 | −6.505936E−02 | 9.230484E−04 | 1.239636E−02 | 4.462317E−02 | 8.004692E−01 | 8.766533E−01 |
| A10 | −7.149263E−03 | 6.075169E−02 | 2.037773E−02 | 1.269593E−02 | −8.508071E−02 | −8.427267E−01 | −9.408740E−01 |
| A12 | 4.289710E−03 | −3.382574E−02 | −3.866724E−02 | −1.637783E−01 | 6.795477E−02 | 5.076751E−01 | 5.984788E−01 |
| A14 | −8.970178E−04 | 6.195150E−03 | 1.469867E−02 | 6.363609E−02 | −3.740079E−02 | −1.235538E−01 | −1.635676E−01 |
| A16 | 0.000000E+00 | 0.000000E+00 | 0.000000E+00 | 0.000000E+00 | 0.000000E+00 | 0.000000E+00 | 8.038193E−03 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | 0.000000E+00 | −5.214826E+00 | −3.099051E+00 | 5.275000E−01 | −1.650175E+01 | −2.654978E+01 | −4.538170E+00 |
| A4 | −4.587295E−02 | −2.329669E−01 | −4.523061E−01 | −1.814049E−01 | 3.929722E−03 | −2.480860E−01 | −1.880773E−01 |
| A6 | −1.081941E−02 | 2.715081E−01 | 4.412235E−01 | 1.375461E−01 | 1.188054E−01 | 1.388689E−01 | 1.199882E−01 |
| A8 | −5.761718E−02 | −2.261598E−01 | −4.164109E−01 | −1.367150E−01 | −1.377096E−01 | −3.198357E−02 | −5.182617E−02 |
| A10 | 1.031132E−01 | 2.191490E−01 | 2.509824E−01 | 5.445127E−02 | 6.240840E−02 | 1.712680E−03 | 1.378677E−02 |
| A12 | −7.423358E−02 | 8.265038E−02 | −8.251939E−02 | −9.048004E−03 | −1.418897E−02 | 6.011504E−04 | −2.162956E−03 |
| A14 | 2.320915E−02 | −5.042962E−02 | 1.391058E−02 | 5.789819E−04 | 1.604373E−03 | −1.104875E−04 | 1.813461E−04 |
| A16 | −1.806116E−03 | 8.940907E−03 | −9.598113E−04 | −1.375846E−05 | −7.121971E−05 | 5.609697E−06 | −6.214102E−06 |

The imaging lens in Example 1 satisfies conditional expressions (1) to (27) as shown in Table 8.

Figure 2:
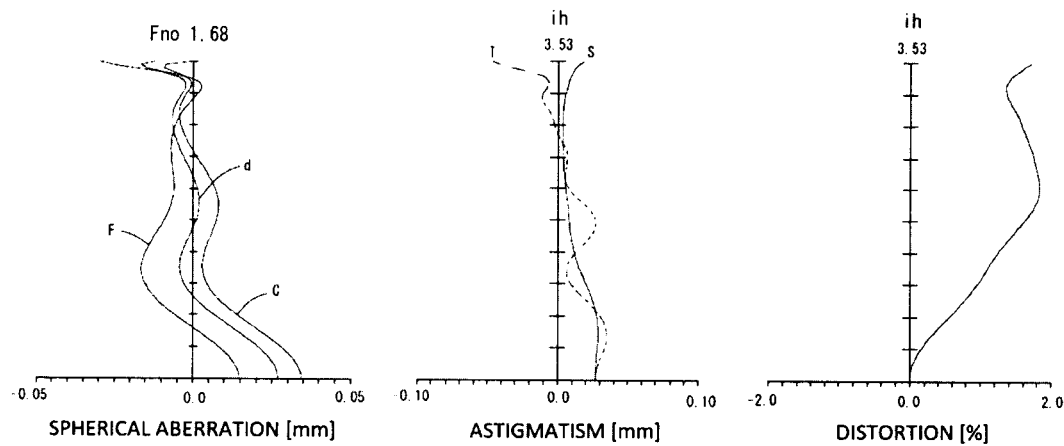
FIG. 2 shows spherical aberration, astigmatism, and distortion of the imaging lens in Example 1 according to the present invention.
Figure 3:
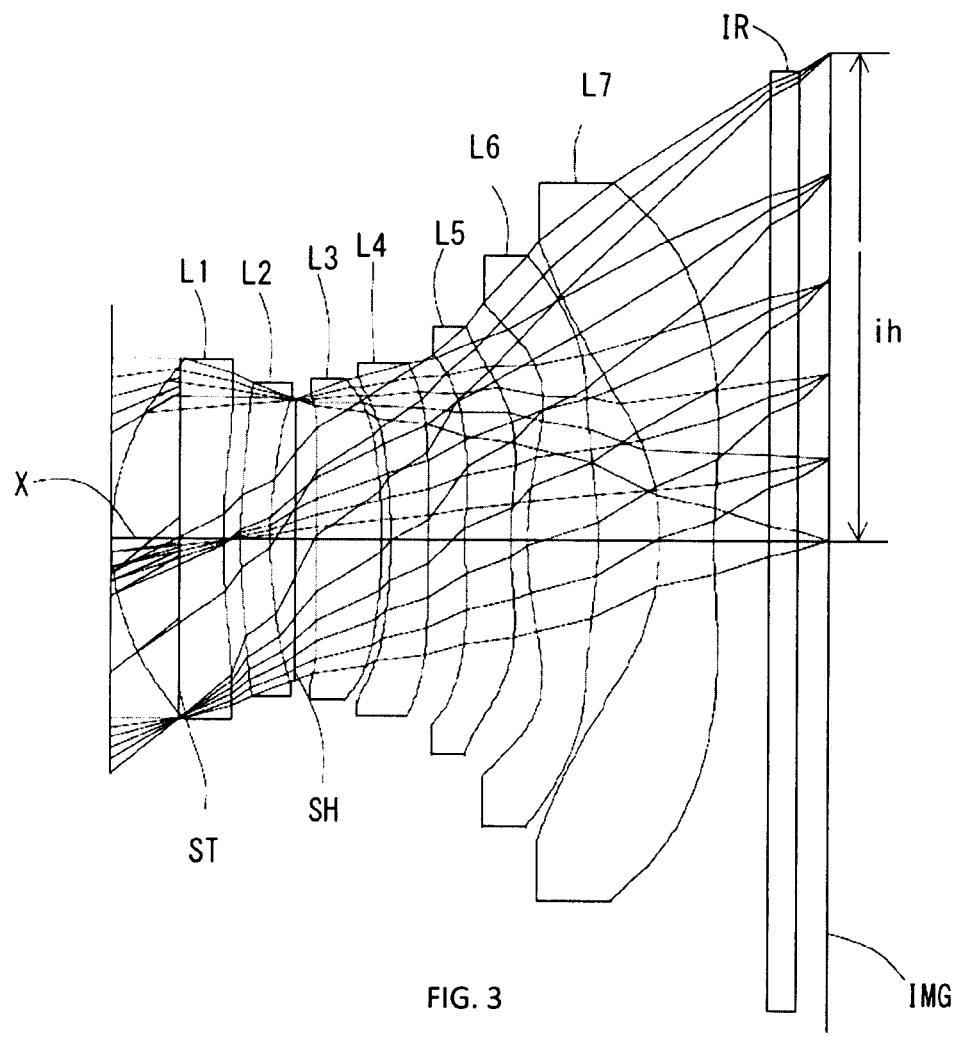
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12 and 14). As shown in FIG. 2, each aberration is corrected excellently.

Example 2

The basic lens data is shown below in Table 2.

TABLE 2

Example 2

Unit mm f = 4.25
Fno = 1.65
ω(°) = 39.2
ih = 3.53
TTL = 5.15

Surface Data

| i | r | d | Nd | vd |
|---|---|---|---|---|
| (Object) | Infinity | Infinity | | |
| 1 (Stop) | Infinity | −0.4900 | | |
| 2* | 1.8062 | 0.8122 | 1.544 | 55.57 (vd1) |
| 3* | 4.5882 | 0.1221 | | |
| 4* | 3.6620 | 0.2200 | 1.671 | 19.24 (vd2) |

TABLE 2-continued

Example 2

| | | | | | |
|---|---|---|---|---|---|
| 5* | 3.2414 | 0.1858 | | | |
| 6 | Infinity | 0.1455 | | | |
| 7* | 23.5022 | 0.4805 | 1.544 | | 55.57 (vd3) |
| 8* | −3.3797 | 0.0627 | | | |
| 9* | −3.8478 | 0.2772 | 1.671 | | 19.24 (vd4) |
| 10* | 380.7736 | 0.2708 | | | |
| 11* | 6.2051 | 0.3287 | 1.671 | | 19.24 (vd5) |
| 12* | 2.2667 | 0.1231 | | | |
| 13* | 2.3158 | 0.5133 | 1.639 | | 23.52 (vd6) |
| 14* | −2.9606 | 0.4536 | | | |
| 15* | −2.1696 | 0.3940 | 1.607 | | 28.92 (vd7) |
| 16* | 3.9609 | 0.4000 | | | |
| 17 | Infinity | 0.2100 | 1.517 | | 64.20 |
| 18 | Infinity | 0.2187 | | | |
| Image Plane | | | | | |

Constituent Lens Data

| Lens | Start Surface | Focal Length | | | | Sag at Peripheral Area of Effective Diameter |
|---|---|---|---|---|---|---|
| 1 | 2 | 4.967 | | Composite Focal Length | Sag3F | −0.056 |
| 2 | 4 | −53.256 | f12 | 5.222 | Sag4R | −0.189 |
| 3 | 7 | 5.468 | | Entrance Pupil Diameter | | |
| 4 | 9 | −5.678 | EPD | 2.580 | | |
| 5 | 11 | −5.509 | | | | |
| 6 | 13 | 2.113 | | | | |
| 7 | 15 | −2.255 | | | | |

Aspheric Surface Data

| | Second Surface | Third Surface | Fourth Surface | Fifth Surface | Seventh Surface | Eighth Surface | Ninth Surface |
|---|---|---|---|---|---|---|---|
| k | −7.059977E−01 | 1.057770E+01 | 7.476512E+00 | −1.873787E+01 | −1.138449E−01 | 6.183010E+00 | −1.629599E+00 |
| A4 | 1.984529E−02 | −8.005677E−02 | −1.321686E−01 | 1.019797E−02 | −1.623832E−02 | 2.332734E−01 | 1.874101E−01 |
| A6 | −5.615510E−03 | 4.463799E−02 | 2.521612E−02 | −3.147020E−02 | −7.994545E−03 | −5.295503E−01 | −5.760892E−01 |
| A8 | 9.400518E−03 | −6.450336E−02 | 3.779911E−03 | 1.128305E−02 | 1.093909E−02 | 7.980199E−01 | 8.645217E−01 |
| A10 | −7.143014E−03 | 6.088273E−02 | 2.901174E−02 | 1.286189E−01 | −8.391019E−02 | −8.653226E−01 | −9.476647E−01 |
| A12 | 4.756611E−03 | −3.379272E−02 | −3.627248E−02 | −1.574885E−01 | 8.855462E−02 | 5.036202E−01 | 5.942831E−01 |
| A14 | −1.745779E−03 | 6.701528E−03 | 1.119668E−02 | 6.050582E−02 | −3.840407E−02 | −1.141315E−01 | −1.631839E−01 |
| A16 | 0.000000E+00 | 0.000000E+00 | 0.000000E+00 | 0.000000E+00 | 0.000000E+00 | 0.000000E+00 | 1.072884E−02 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | 0.000000E+00 | 2.708593E+00 | −2.519305E+00 | 2.689841E−01 | −2.562834E+01 | −8.575217E+00 | 1.139115E−01 |
| A4 | −2.572345E−02 | −2.769768E−01 | −4.564387E−01 | −1.585516E−01 | 4.195296E−03 | −2.240239E−01 | −1.817883E−01 |
| A6 | −2.724270E−02 | 3.112997E−01 | 4.414520E−01 | 1.293593E−01 | 1.191443E−01 | 1.360247E−01 | 1.169606E−01 |
| A8 | −5.839866E−02 | −2.358037E−01 | −4.159167E−01 | −1.368721E−01 | −1.379141E−01 | −3.235785E−02 | −5.151610E−02 |
| A10 | 1.081483E−01 | 1.837008E−02 | 2.509377E−01 | 5.452412E−02 | 6.244411E−02 | 1.727269E−03 | 1.381571E−02 |
| A12 | −7.326931E−02 | 8.495911E−02 | −8.255548E−02 | −9.037906E−03 | −1.418117E−02 | 6.106430E−04 | −2.166375E−03 |
| A14 | 2.208479E−02 | −4.850001E−02 | 1.391122E−02 | 5.793461E−04 | 1.603912E−03 | −1.095353E−04 | 1.805711E−04 |
| A16 | −2.086277E−03 | 8.095810E−03 | −9.603689E−04 | −1.336638E−05 | −7.161594E−05 | 5.382637E−06 | −6.139628E−06 |

The imaging lens in Example 2 satisfies conditional expressions (1) to (27) as shown in Table 8.

Figure 4:
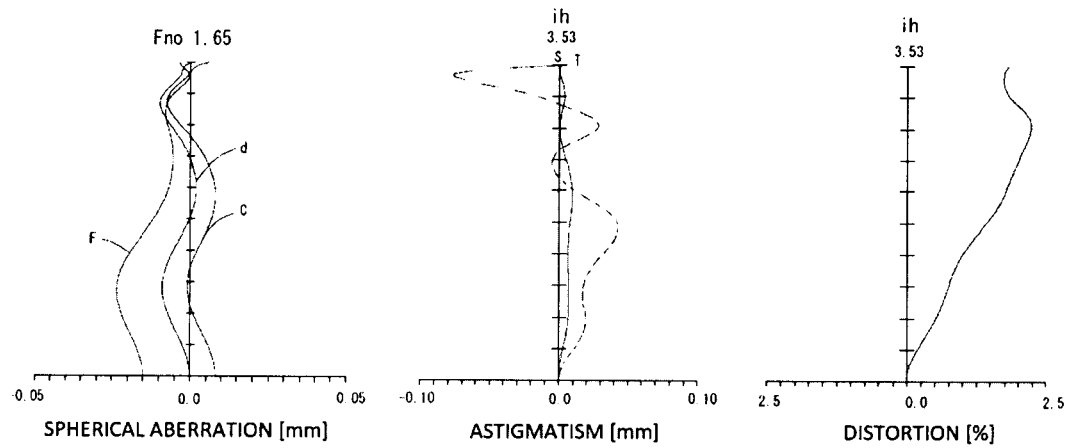
FIG. 4 shows spherical aberration, astigmatism, and distortion of the imaging lens in Example 2 according to the present invention.
Figure 5:
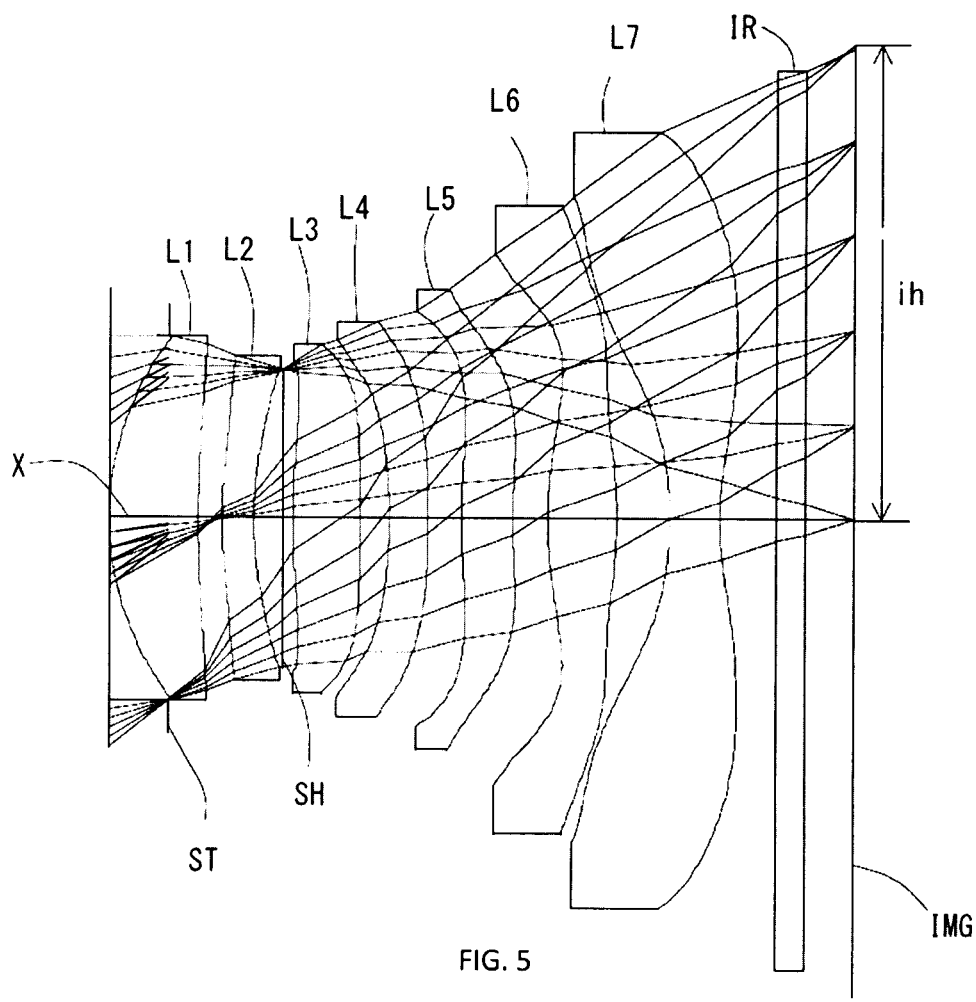
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3

Unit mm f = 4.13
Fno = 1.62
ω(°) = 38.0

TABLE 3-continued

Example 3 ih = 3.28
TTL = 5.21

Surface Data

| i | r | d | Nd | vd |
|---|---|---|---|---|
| (Object) | Infinity | Infinity | | |
| 1 (Stop) | Infinity | −0.4200 | | |
| 2* | 2.0411 | 0.6303 | 1.544 | 55.57 (vd1) |
| 3* | 6.9838 | 0.1699 | | |
| 4* | 3.4646 | 0.2214 | 1.671 | 19.24 (vd2) |
| 5* | 2.4061 | 0.2090 | | |
| 6 | Infinity | 0.0714 | | |
| 7* | 6.8264 | 0.4751 | 1.544 | 55.57 (vd3) |
| 8* | −11.9307 | 0.2067 | | |
| 9* | −3.3866 | 0.2789 | 1.661 | 20.37 (vd4) |
| 10* | −6.4826 | 0.2340 | | |
| 11* | 3.5029 | 0.3631 | 1.544 | 55.57 (vd5) |
| 12* | 3.0933 | 0.2508 | | |
| 13* | 2.5962 | 0.4930 | 1.544 | 55.57 (vd6) |
| 14* | −2.6640 | 0.3776 | | |
| 15* | −2.5388 | 0.3538 | 1.535 | 55.66 (vd7) |
| 16* | 2.0839 | 0.4000 | | |
| 17 | Infinity | 0.2100 | 1.517 | 64.20 |
| 18 | Infinity | 0.3406 | | |
| Image Plane | | | | |

Constituent Lens Data

| Lens | Start Surface | Focal Length | | | Sag at Peripheral Area of Effective Diameter |
|---|---|---|---|---|---|
| 1 | 2 | 5.075 | | Composite | Sag3F | 0.002 |
| 2 | 4 | −12.816 | | Focal Length | Sag4R | −0.362 |
| 3 | 7 | 8.056 | f12 | 7.279 | | |
| 4 | 9 | −11.121 | | Entrance | | |
| 5 | 11 | −70.729 | | Pupil Diameter | | |
| 6 | 13 | 2.500 | EPD | 2.548 | | |
| 7 | 15 | −2.084 | | | | |

Aspheric Surface Data

| | Second Surface | Third Surface | Fourth Surface | Fifth Surface | Seventh Surface | Eighth Surface | Ninth Surface |
|---|---|---|---|---|---|---|---|
| k | −9.421566E−01 | 1.307145E+01 | 1.349970E+00 | −1.220454E+01 | 1.257807E+01 | 9.000000E+01 | 3.763721E+00 |
| A4 | 1.133954E−02 | −4.835978E−02 | −1.054758E−01 | 3.500599E−02 | 1.435939E−02 | 1.327335E−01 | 1.657076E−01 |
| A6 | 7.120172E−03 | 5.169766E−02 | 2.074763E−02 | −5.355221E−02 | −7.874152E−02 | −4.774709E−01 | −5.660568E−01 |
| A8 | −2.226298E−05 | −7.240124E−02 | −3.762735E−03 | −2.440824E−02 | 5.945393E−02 | 7.809588E−01 | 8.655371E−01 |
| A10 | −7.763845E−03 | 6.073338E−02 | 3.279561E−02 | 1.394142E−01 | −7.330017E−02 | −8.330790E−01 | −8.940126E−01 |
| A12 | 7.048263E−03 | −2.536182E−02 | −2.827370E−02 | −1.243245E−01 | 4.096033E−02 | 4.426809E−01 | 5.385254E−01 |
| A14 | −1.993155E−03 | 3.852834E−03 | 7.586437E−03 | 3.894726E−02 | −1.185023E−02 | −8.975042E−02 | −1.579309E−01 |
| A16 | 0.000000E+00 | 0.000000E+00 | 0.000000E+00 | 0.000000E+00 | 0.000000E+00 | 0.000000E+00 | 1.689352E−02 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | 0.000000E+00 | −2.381136E+01 | 6.001322E−01 | 3.874708E−01 | −3.672511E+01 | −2.731183E+01 | −4.668482E−01 |
| A4 | −5.531599E−03 | −1.831977E−01 | −4.220985E−01 | −1.428726E−01 | −2.201591E−03 | −2.227820E−01 | −2.198308E−01 |
| A6 | −7.079177E−02 | 2.034785E−01 | 4.184678E−01 | 1.344257E−01 | 1.235323E−01 | 1.303949E−01 | 1.240422E−01 |
| A8 | −4.627910E−02 | −1.761024E−01 | −4.021381E−01 | −1.323927E−01 | −1.337960E−01 | −2.999080E−02 | −5.084782E−02 |
| A10 | 1.255150E−01 | 1.064189E−02 | 2.361391E−01 | 5.117251E−02 | 5.892520E−02 | 1.645241E−03 | 1.304518E−02 |
| A12 | −7.246544E−02 | 7.444478E−02 | −7.668335E−02 | −8.501635E−03 | −1.318767E−02 | 5.538711E−04 | −2.005137E−03 |
| A14 | 1.216513E−02 | −4.222662E−02 | 1.309101E−02 | 5.345820E−04 | 1.495967E−03 | −1.041042E−04 | 1.676599E−04 |
| A16 | 6.340728E−04 | 6.948176E−03 | −9.298752E−04 | −4.362565E−06 | −6.867073E−05 | 5.190497E−06 | −5.875119E−06 |

The imaging lens in Example 3 satisfies conditional expressions (1) to (27) as shown in Table 8.

Figure 6:
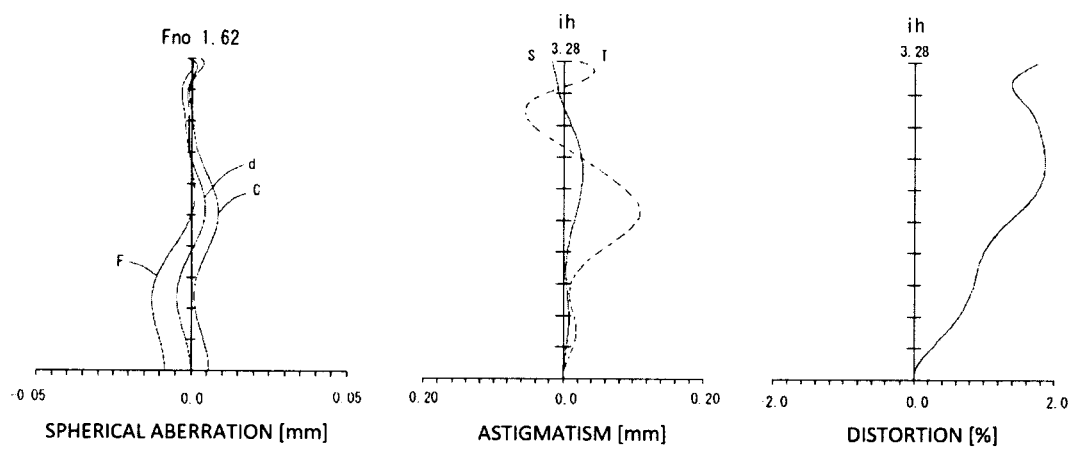
FIG. 6 shows spherical aberration, astigmatism, and distortion of the imaging lens in Example 3 according to the present invention.
Figure 7:
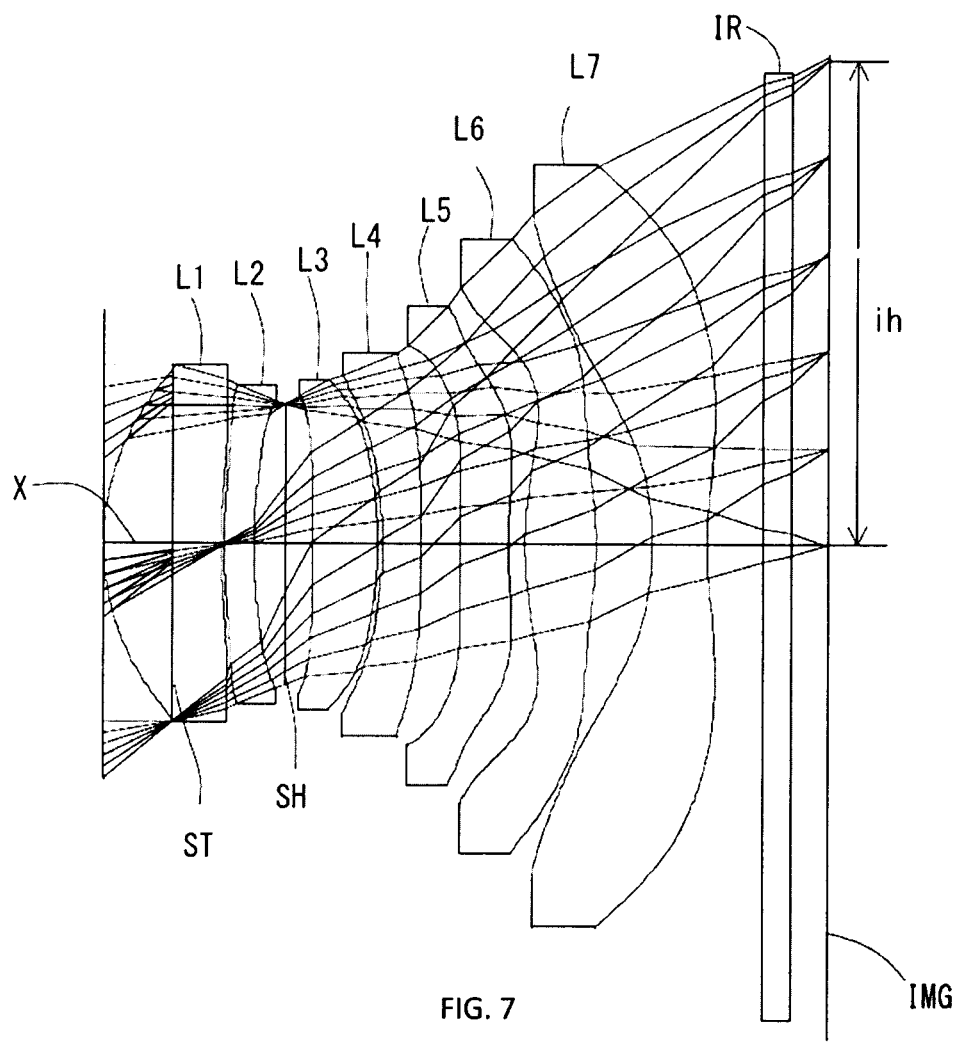
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm $f = 4.32$
$Fno = 1.68$
$\omega(°) = 38.8$
$ih = 3.53$
$TTL = 5.20$

Surface Data

| i | r | d | Nd | vd |
|---|---|---|----|----|
| (Object) | Infinity | Infinity | | |
| 1 (Stop) | Infinity | −0.5000 | | |
| 2* | 1.8065 | 0.8491 | 1.544 | 55.57 (vd1) |
| 3* | 3.2421 | 0.0261 | | |
| 4* | 3.3170 | 0.2200 | 1.635 | 23.97 (vd2) |
| 5* | 4.3717 | 0.2277 | | |
| 6 | Infinity | 0.1916 | | |
| 7* | 166.7452 | 0.4804 | 1.544 | 55.57 (vd3) |
| 8* | −2.3591 | 0.0363 | | |
| 9* | −2.3500 | 0.2772 | 1.661 | 20.37 (vd4) |
| 10* | −19.0856 | 0.2864 | | |
| 11* | 5.9898 | 0.3497 | 1.661 | 20.37 (vd5) |
| 12* | 2.4671 | 0.1234 | | |
| 13* | 2.5287 | 0.5173 | 1.614 | 25.58 (vd6) |
| 14* | −2.8414 | 0.4126 | | |
| 15* | −2.5813 | 0.3994 | 1.584 | 30.10 (vd7) |
| 16* | 2.8295 | 0.4000 | | |
| 17 | Infinity | 0.2100 | 1.517 | 64.20 |
| 18 | Infinity | 0.2613 | | |
| Image Plane | | | | |

Constituent Lens Data

| Lens | Start Surface | Focal Length | | | Sag at Peripheral Area of Effective Diameter |
|------|---------------|--------------|---|---|---|
| 1 | 2 | 6.209 | Composite | Sag3F | −0.094 |
| 2 | 4 | 20.032 | Focal Length | Sag4R | −0.177 |
| 3 | 7 | 4.282 | f12 | 4.862 | |
| 4 | 9 | −4.079 | Entrance | | |
| 5 | 11 | −6.604 | Pupil Diameter | | |
| 6 | 13 | 2.261 | EPD | 2.580 | |
| 7 | 15 | −2.251 | | | |

Aspheric Surface Data

| | Second Surface | Third Surface | Fourth Surface | Fifth Surface | Seventh Surface | Eighth Surface | Ninth Surface |
|---|---|---|---|---|---|---|---|
| k | −8.713574E−01 | 5.187932E+00 | 6.083215E+00 | −3.444220E+01 | 0.000000E+00 | 2.387611E+00 | −7.790143E+00 |
| A4 | 1.799885E−02 | −2.002685E−01 | −2.028143E−01 | 2.784480E−02 | −4.075504E−02 | 2.855199E−01 | 2.078458E−01 |
| A6 | 6.323573E−03 | 9.129184E−02 | 7.899209E−02 | −6.085758E−03 | −3.584771E−04 | −5.560832E−02 | −5.955869E−01 |
| A8 | 3.132314E−04 | −4.320646E−02 | 5.096319E−03 | −1.163409E−02 | 1.375507E−02 | 7.887800E−01 | 8.858175E−01 |
| A10 | −6.012494E−03 | 4.912646E−02 | 1.817053E−02 | 1.270235E−01 | −8.052377E−02 | −8.598284E−01 | −9.456142E−01 |
| A12 | 7.225464E−03 | −4.271509E−02 | −3.493940E−02 | −1.499087E−01 | 5.900914E−02 | 5.183157E−01 | 5.905899E−01 |
| A14 | −2.845889E−03 | 1.013785E−02 | 1.052729E−02 | 6.085400E−02 | −1.505322E−02 | −1.203122E−01 | −1.688144E−01 |
| A16 | 0.000000E+00 | 0.000000E+00 | 0.000000E+00 | 0.000000E+00 | 0.000000E+00 | 0.000000E+00 | 1.330899E−02 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | 0.000000E+00 | −2.054055E−01 | −1.831057E−02 | 6.118166E−01 | −2.943461E+01 | −1.766004E+01 | −2.522795E+00 |
| A4 | −1.883962E−02 | −2.497532E−01 | −4.331916E−01 | −1.461394E−01 | −2.759665E−03 | −2.353954E−01 | −1.919556E−01 |
| A6 | −1.552552E−02 | 2.607081E−01 | 4.068323E−01 | 1.209365E−01 | 1.260270E−01 | 1.374028E−01 | 1.244629E−01 |
| A8 | −5.606952E−02 | −2.041775E−01 | −4.098793E−01 | −1.371253E−01 | −1.396376E−01 | −3.186736E−02 | −5.390315E−02 |
| A10 | 1.103371E−01 | 1.440439E−01 | 2.525492E−01 | 5.474855E−02 | 6.238795E−02 | 1.613419E−03 | 1.419125E−02 |

TABLE 4-continued

| | | | Example 4 | | | | |
|---|---|---|---|---|---|---|---|
| A12 | −7.565305E−02 | 8.051068E−02 | −8.287436E−02 | −8.801273E−03 | −1.413217E−02 | 6.082489E−04 | −2.173418E−03 |
| A14 | 2.023766E−02 | −4.502192E−02 | 1.382136E−02 | 5.810112E−04 | 1.608719E−03 | −1.073754E−04 | 1.766214E−04 |
| A16 | −1.195161E−03 | 7.160001E−03 | −9.471705E−04 | −2.823235E−05 | −7.304324E−05 | 5.240848E−06 | −5.861839E−06 |

The imaging lens in Example 4 satisfies conditional expressions (1) to (27) as shown in Table 8.

Figure 8:
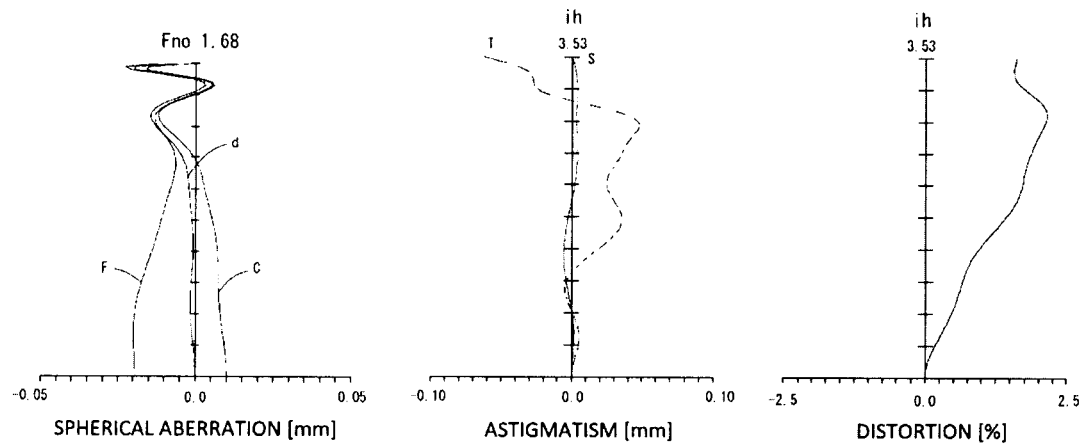
FIG. 8 shows spherical aberration, astigmatism, and distortion of the imaging lens in Example 4 according to the present invention.
Figure 9:
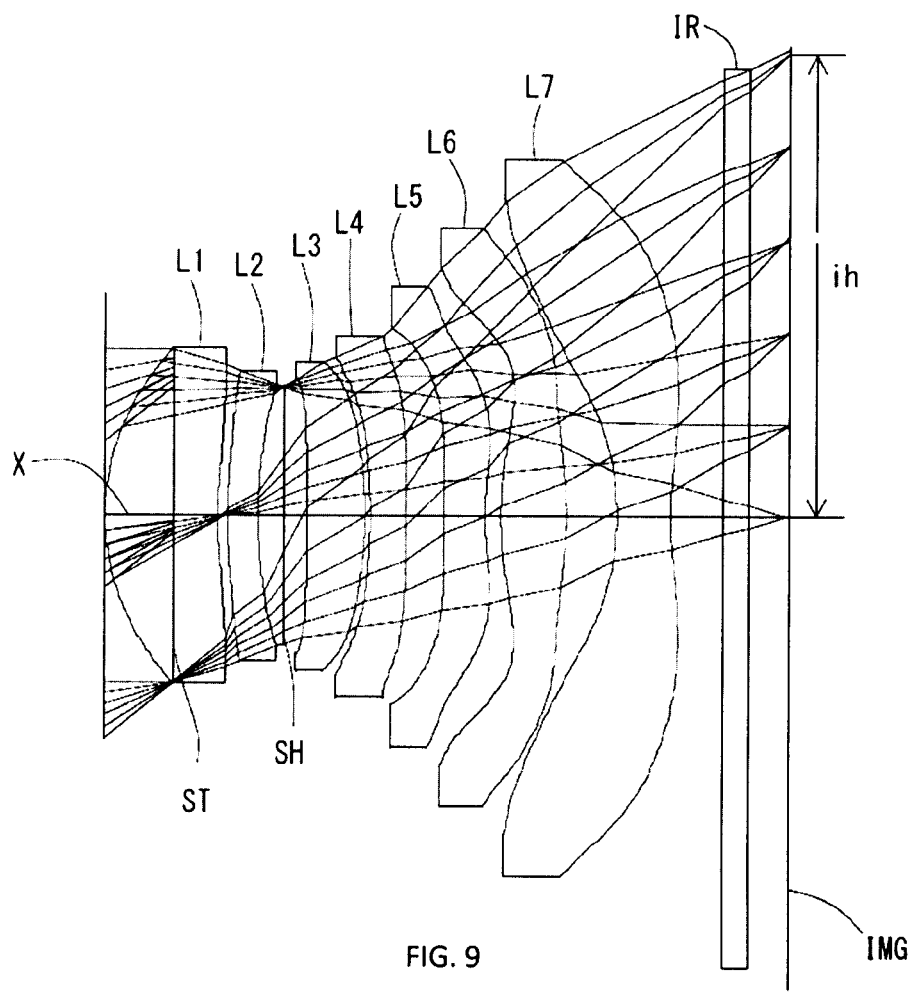
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unit mm $f = 4.10$
$Fno = 1.71$
$\omega(°) = 38.2$
$ih = 3.28$
$TTL = 4.90$

Surface Data

| i | r | d | Nd | vd |
|---|---|---|---|---|
| (Object) | Infinity | Infinity | | |
| 1 (Stop) | Infinity | −0.5000 | | |
| 2* | 1.7009 | 0.8198 | 1.544 | 55.57 (vd1) |
| 3* | 3.8099 | 0.0651 | | |
| 4* | 3.2848 | 0.2232 | 1.671 | 19.24 (vd2) |
| 5* | 3.3175 | 0.1910 | | |
| 6 | Infinity | 0.1612 | | |
| 7* | 1343.9750 | 0.4235 | 1.544 | 55.57 (vd3) |
| 8* | −2.7770 | 0.0421 | | |
| 9* | −3.4680 | 0.2578 | 1.661 | 20.37 (vd4) |
| 10* | 727.0879 | 0.2731 | | |
| 11* | 6.7233 | 0.3058 | 1.661 | 20.37 (vd5) |
| 12* | 2.0838 | 0.1138 | | |
| 13* | 2.2381 | 0.4806 | 1.640 | 23.53 (vd6) |
| 14* | −2.6065 | 0.3656 | | |
| 15* | −2.4403 | 0.3924 | 1.584 | 30.10 (vd7) |
| 16* | 2.7894 | 0.3720 | | |
| 17 | Infinity | 0.1953 | 1.517 | 64.20 |
| 18 | Infinity | 0.2880 | | |
| Image Plane | | | | |

Constituent Lens Data

| Lens | Start Surface | Focal Length | | | | Sag at Peripheral Area of Effective Diameter |
|---|---|---|---|---|---|---|
| 1 | 2 | 4.970 | | Composite | Sag3F | −0.069 |
| 2 | 4 | 132.776 | | Focal Length | Sag4R | −0.167 |
| 3 | 7 | 5.097 | f12 | 4.699 | | |
| 4 | 9 | −5.218 | | Entrance Pupil | | |
| 5 | 11 | −4.689 | | Diameter | | |
| 6 | 13 | 1.958 | EPD | 2.400 | | |
| 7 | 15 | −2.170 | | | | |

Aspheric Surface Data

| | Second Surface | Third Surface | Fourth Surface | Fifth Surface | Seventh Surface | Eighth Surface | Ninth Surface |
|---|---|---|---|---|---|---|---|
| k | −7.925997E−01 | 8.025059E+00 | 6.600002E+00 | −1.230211E+01 | 0.000000E+00 | 4.483226E+00 | −2.038091E+00 |
| A4 | 2.474445E−02 | −1.416960E−01 | −1.650681E−01 | 1.171603E−02 | −3.283357E−02 | 2.938086E−01 | 2.374934E−01 |
| A6 | −4.685074E−03 | 8.131421E−02 | 3.418661E−02 | −3.296574E−02 | 5.770227E−03 | −7.413880E−01 | −8.325261E−01 |
| A8 | 1.150193E−02 | −1.027187E−01 | 1.287678E−02 | 1.326687E−02 | 2.478468E−02 | 1.312262E+00 | 1.459255E+00 |
| A10 | −1.269658E−02 | 1.153581E−01 | 5.699390E−02 | 2.432695E−01 | −1.753389E−01 | −1.660207E+00 | −1.827336E+00 |

TABLE 5-continued

| | | | Example 5 | | | | |
|---|---|---|---|---|---|---|---|
| A12 | 1.048073E−02 | −7.619726E−02 | −8.267767E−02 | −3.429758E−01 | 1.869151E−01 | 1.127734E+00 | 1.315645E+00 |
| A14 | −4.119798E−03 | 1.718689E−02 | 2.759003E−02 | 1.497193E−01 | −8.235755E−02 | −2.987608E−01 | −4.209083E−01 |
| A16 | 0.000000E+00 | 0.000000E+00 | 0.000000E+00 | 0.000000E+00 | 0.000000E+00 | 0.000000E+00 | 3.335798E−02 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | 0.000000E+00 | 2.112709E+00 | −1.671019E+00 | 3.876869E−01 | −1.973596E+01 | −1.642796E+01 | −9.895395E−01 |
| A4 | −3.856639E−02 | −3.341502E−01 | −5.741281E−01 | −1.946107E−01 | 1.610352E−02 | −2.838652E−01 | −2.389077E−01 |
| A6 | −3.407242E−02 | 4.242819E−01 | 6.223601E−01 | 1.811665E−01 | 1.692566E−01 | 1.954684E−01 | 1.722407E−01 |
| A8 | −9.756804E−02 | −3.810218E−01 | −6.857108E−01 | −2.258442E−01 | −2.297601E−01 | −5.366523E−02 | −8.690469E−02 |
| A10 | 2.100908E−01 | 3.493625E−02 | 4.825763E−01 | 1.047321E−01 | 1.200454E−01 | 3.299746E−03 | 2.683961E−02 |
| A12 | −1.624409E−01 | 1.892661E−01 | −1.838069E−01 | −2.005020E−02 | −3.147722E−02 | 1.356742E−03 | −4.824460E−03 |
| A14 | 5.610982E−02 | −1.234080E−01 | 3.573043E−02 | 1.467285E−03 | 4.120544E−03 | −2.792729E−04 | 4.591835E−04 |
| A16 | −6.303629E−03 | 2.337860E−02 | −2.845575E−03 | −3.881386E−05 | −2.135062E−04 | 1.570742E−05 | −1.778641E−05 |

The imaging lens in Example 5 satisfies conditional expressions (1) to (27) as shown in Table 8.

Figure 10:
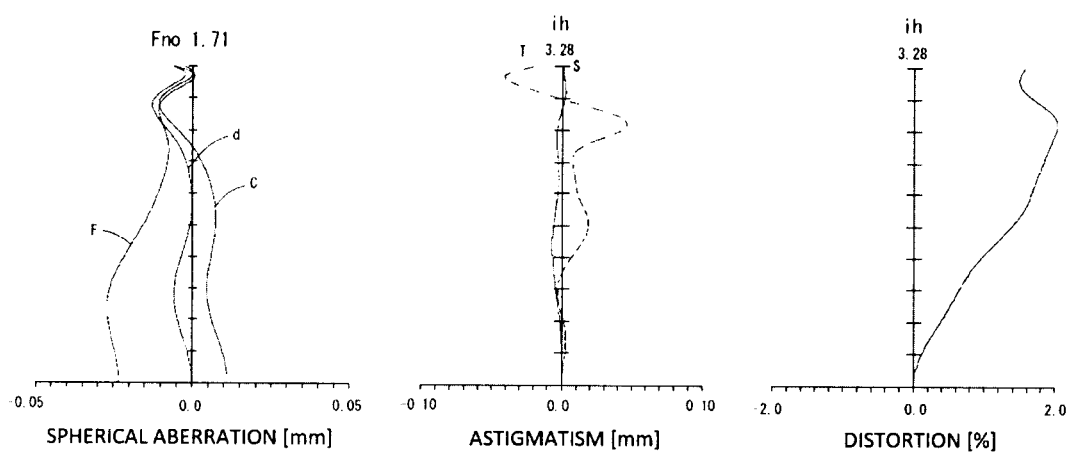
FIG. 10 shows spherical aberration, astigmatism, and distortion of the imaging lens in Example 5 according to the present invention.
Figure 11:
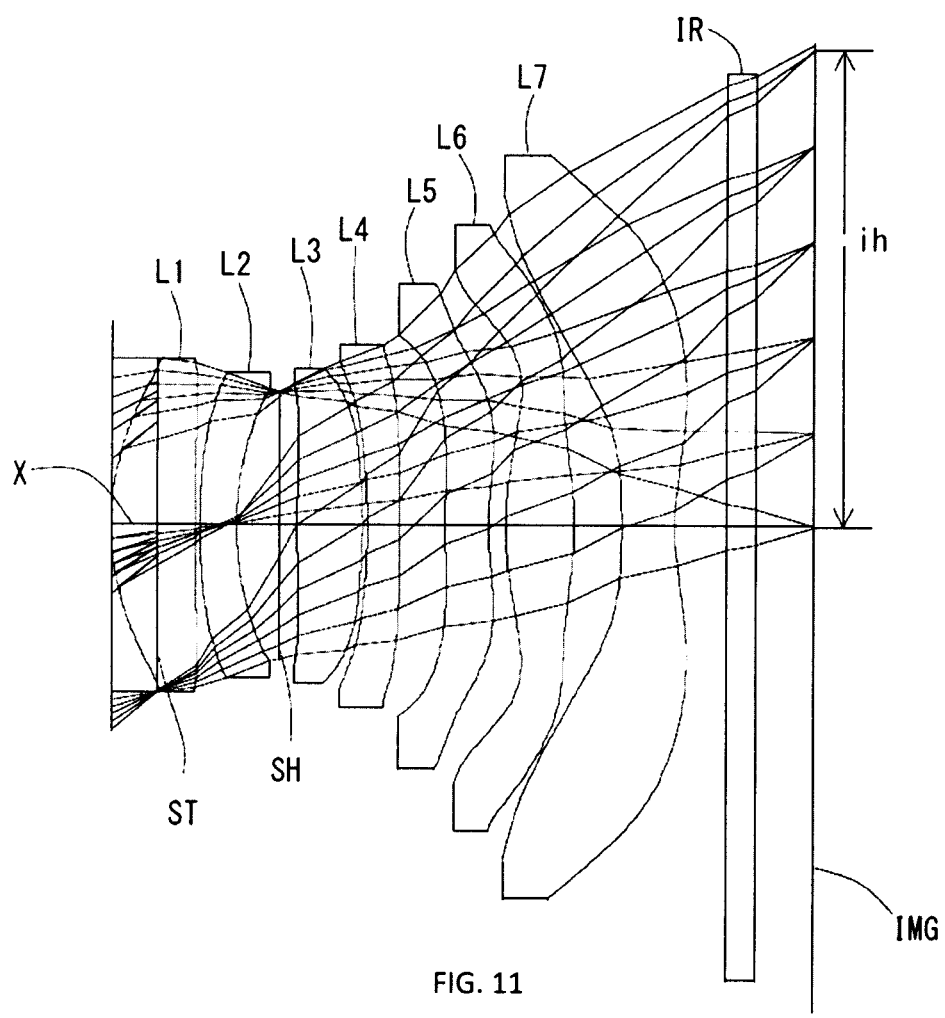
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6

Unit mm f = 4.33
Fno = 1.72
ω(°) = 38.7
ih = 3.53
TTL = 5.24

Surface Data

| i | r | d | Nd | vd |
|---|---|---|---|---|
| (Object) | Infinity | Infinity | | |
| 1 (Stop) | Infinity | −0.3500 | | |
| 2* | 1.9994 | 0.6386 | 1.544 | 55.57 (vd1) |
| 3* | 99.6854 | 0.0300 | | |
| 4* | 4.4748 | 0.2798 | 1.671 | 19.24 (vd2) |
| 5* | 2.4411 | 0.3168 | | |
| 6 | Infinity | 0.1404 | | |
| 7* | 12.8771 | 0.4915 | 1.544 | 55.57 (vd3) |
| 8* | −4.2710 | 0.0388 | | |
| 9* | −4.5299 | 0.2396 | 1.661 | 20.37 (vd4) |
| 10* | −105.5176 | 0.3506 | | |
| 11* | 6.3858 | 0.3292 | 1.661 | 20.37 (vd5) |
| 12* | 2.1307 | 0.1300 | | |
| 13* | 2.3939 | 0.5182 | 1.635 | 23.97 (vd6) |
| 14* | −2.7850 | 0.3633 | | |
| 15* | −8.6909 | 0.3980 | 1.607 | 26.65 (vd7) |
| 16* | 1.8311 | 0.4000 | | |
| 17 | Infinity | 0.2100 | 1.517 | 64.20 |
| 18 | Infinity | 0.4365 | | |
| Image Plane | | | | |

Constituent Lens Data

| Lens | Start Surface | Focal Length | | | | Sag at Peripheral Area of Effective Diameter |
|---|---|---|---|---|---|---|
| 1 | 2 | 3.743 | | Composite Focal Length | Sag3F | −0.034 |
| 2 | 4 | −8.476 | f12 | 5.693 | Sag4R | −0.120 |
| 3 | 7 | 5.958 | | Entrance Pupil Diameter | | |
| 4 | 9 | −7.164 | EPD | 2.520 | | |
| 5 | 11 | −4.989 | | | | |

TABLE 6-continued

| Example 6 | | |
|---|---|---|
| 6 | 13 | 2.109 |
| 7 | 15 | −2.455 |

Aspheric Surface Data

|  | Second Surface | Third Surface | Fourth Surface | Fifth Surface | Seventh Surface | Eighth Surface | Ninth Surface |
|---|---|---|---|---|---|---|---|
| k   | −1.258688E+00 | 0.000000E+00 | 1.099635E+01 | −1.190077E+01 | −8.447967E−01 | 1.022945E+01 | −2.284209E+00 |
| A4  | 1.133262E−02 | 1.136577E−02 | −8.577746E−03 | 8.432139E−02 | −3.037476E−02 | 1.785407E−01 | 1.722502E−01 |
| A6  | −1.352190E−03 | 2.401580E−02 | 2.636930E−02 | −2.217163E−02 | −1.860488E−02 | −5.221634E−01 | −5.371664E−01 |
| A8  | 1.859791E−03 | −6.581040E−02 | −3.494140E−02 | −3.180488E−02 | 4.026978E−02 | 8.129366E−01 | 8.678297E−01 |
| A10 | −7.437041E−03 | 6.371184E−02 | 3.225428E−02 | 1.281564E−01 | −8.708930E−02 | −8.688952E−01 | −9.515689E−01 |
| A12 | 4.699592E−03 | −3.365710E−02 | −1.874409E−02 | −1.310129E−01 | 5.364629E−02 | 4.970262E−01 | 5.877186E−01 |
| A14 | −1.610147E−03 | 6.862857E−03 | 4.037543E−03 | 4.996970E−02 | −9.342678E−03 | −1.100116E−01 | −1.668497E−01 |
| A16 | 0.000000E+00 | 0.000000E+00 | 0.000000E+00 | 0.000000E+00 | 0.000000E+00 | 0.000000E+00 | 1.440897E−02 |

|  | Tenth Surface | Eleventh Surface | Twelfth Surface | Thirteenth Surface | Fourteenth Surface | Fifteenth Surface | Sixteenth Surface |
|---|---|---|---|---|---|---|---|
| k   | 0.000000E+00 | 9.200564E+00 | −2.146445E+00 | 3.025211E−01 | −1.945961E+01 | −3.391248E+00 | −9.150122E+00 |
| A4  | −1.694751E−02 | −2.788119E−01 | −4.554091E−01 | −1.458933E−01 | 2.051076E−02 | −2.519186E−01 | −1.759306E−01 |
| A6  | −8.844498E−04 | 3.073536E−01 | 4.457305E−01 | 1.345272E−01 | 1.159395E−01 | 1.398151E−01 | 1.176896E−01 |
| A8  | −5.922784E−02 | −2.302913E−01 | −4.170009E−01 | −1.384366E−01 | −1.384435E−01 | −3.208560E−02 | −5.161150E−02 |
| A10 | 9.842189E−02 | 2.153227E−02 | 2.503549E−01 | 5.429232E−02 | 6.246566E−02 | 1.707533E−03 | 1.380795E−02 |
| A12 | −7.384879E−02 | 8.344914E−02 | −8.254780E−02 | −9.056753E−03 | −1.414817E−02 | 6.030816E−04 | −2.165965E−03 |
| A14 | 2.363022E−02 | −5.023320E−02 | 1.394718E−02 | 5.829515E−04 | 1.606194E−03 | −1.100820E−04 | 1.808161E−04 |
| A16 | −2.071248E−03 | 8.725941E−03 | −9.584168E−04 | −8.878599E−06 | −7.254667E−05 | 5.535158E−06 | −6.154864E−06 |

The imaging lens in Example 6 satisfies conditional expressions (1) to (27) as shown in Table 8.

Figure 12:
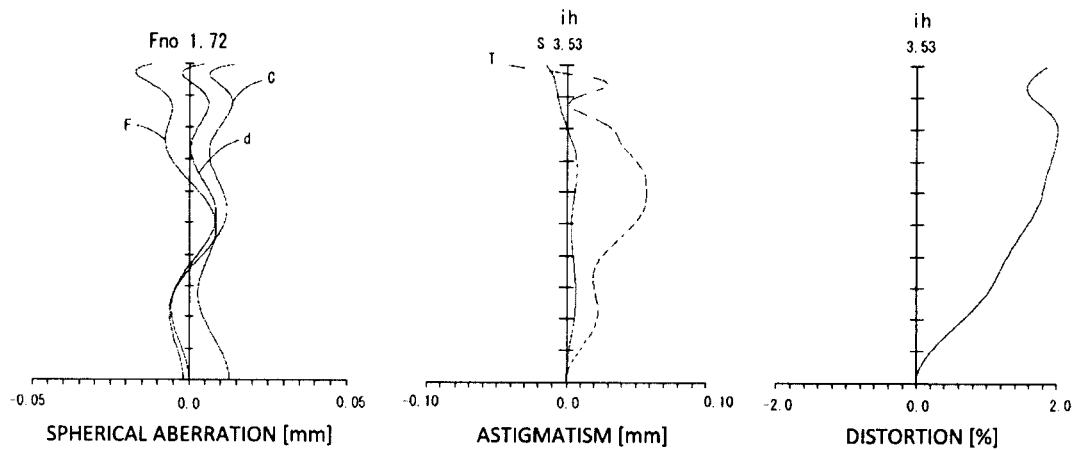
FIG. 12 shows spherical aberration, astigmatism, and distortion of the imaging lens in Example 6 according to the present invention.
Figure 13:
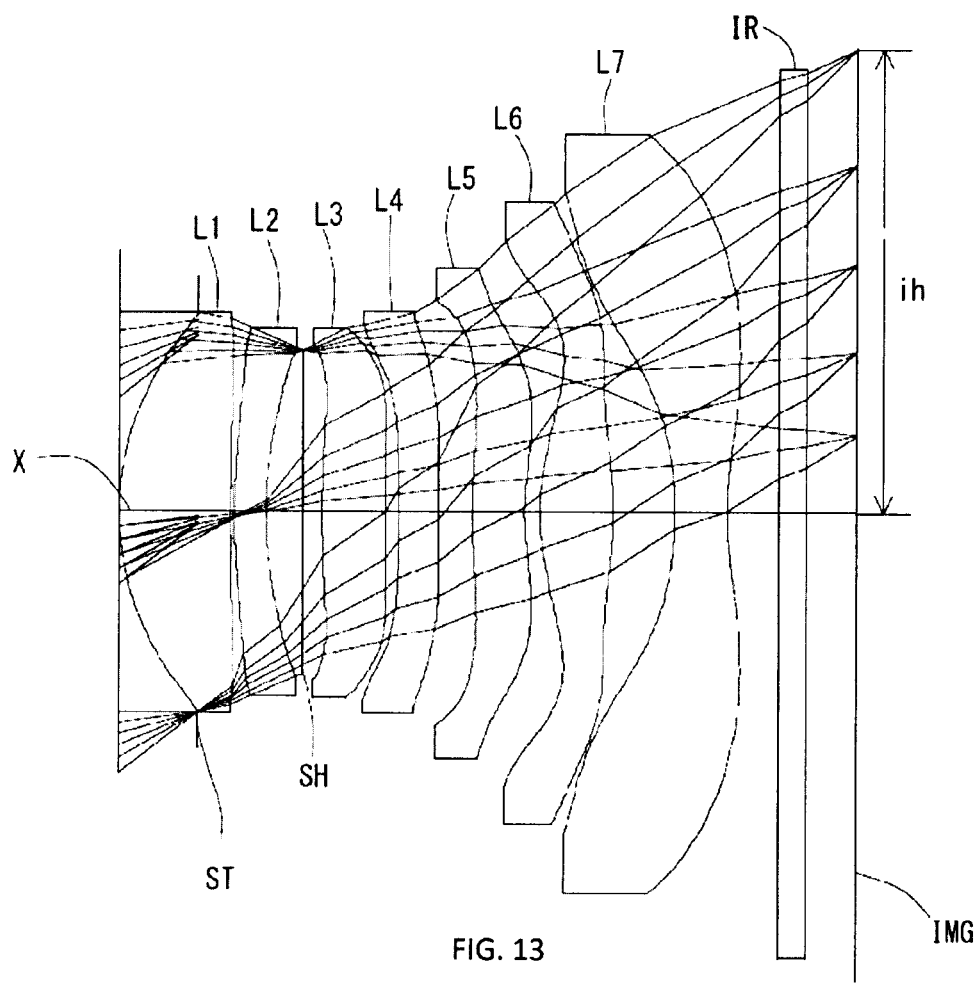
FIG. 13 is a schematic view showing an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

| Example 7 |
|---|

| Unit mm |
|---| f = 4.44
Fno = 1.46
ω(°) = 38.0
ih = 3.53
TTL = 5.59

Surface Data

| i | r | d | Nd | vd |
|---|---|---|---|---|
| (Object) | Infinity | Infinity | | |
| 1 (Stop) | Infinity | −0.6000 | | |
| 2* | 2.1301 | 0.8508 | 1.544 | 55.57 (vd1) |
| 3* | 12.5213 | 0.0300 | | |
| 4* | 4.5209 | 0.2380 | 1.661 | 20.37 (vd2) |
| 5* | 2.8489 | 0.2783 | | |
| 6 | Infinity | 0.1597 | | |
| 7* | 9.3459 | 0.4852 | 1.544 | 55.57 (vd3) |
| 8* | −22.3715 | 0.1061 | | |
| 9* | −7.6502 | 0.2999 | 1.661 | 20.37 (vd4) |
| 10* | 1703.5310 | 0.2635 | | |
| 11* | 4.7370 | 0.3989 | 1.544 | 55.57 (vd5) |
| 12* | 2.0356 | 0.1190 | | |
| 13* | 1.8904 | 0.5602 | 1.544 | 55.57 (vd6) |
| 14* | −2.9311 | 0.4741 | | |

TABLE 7-continued

Example 7

| | | | | | |
|---|---|---|---|---|---|
| 15* | −3.6453 | 0.4018 | 1.535 | | 55.66 (vd7) |
| 16* | 2.4047 | 0.4000 | | | |
| 17 | Infinity | 0.2100 | 1.517 | | 64.20 |
| 18 | Infinity | 0.3811 | | | |
| Image Plane | | | | | |

Constituent Lens Data

| Lens | Start Surface | Focal Length | | | | Sag at Peripheral Area of Effective Diameter |
|---|---|---|---|---|---|---|
| 1 | 2 | 4.588 | | Composite Focal Length | Sag3F | −0.070 |
| 2 | 4 | −12.348 | f12 | 6.404 | Sag4R | −0.193 |
| 3 | 7 | 12.188 | | Entrance Pupil Diameter | | |
| 4 | 9 | −11.515 | EPD | 3.040 | | |
| 5 | 11 | −6.924 | | | | |
| 6 | 13 | 2.204 | | | | |
| 7 | 15 | −2.648 | | | | |

Aspheric Surface Data

| | Second Surface | Third Surface | Fourth Surface | Fifth Surface | Seventh Surface | Eighth Surface | Ninth Surface |
|---|---|---|---|---|---|---|---|
| k | −9.823588E−01 | 2.871910E+01 | 6.023013E+00 | −1.257969E+01 | 5.463302E+00 | 0.000000E+00 | 2.731958E+00 |
| A4 | 8.463909E−03 | −3.908483E−02 | −6.608832E−02 | 3.673983E−02 | 1.321265E−02 | 1.439471E−01 | 1.241880E−01 |
| A6 | 9.604817E−03 | 4.213462E−02 | 5.089680E−03 | −4.082760E−02 | −6.184944E−02 | −3.561308E−01 | −3.886623E−01 |
| A8 | −2.012180E−03 | −4.502549E−02 | −4.225094E−02 | −1.932720E−02 | 4.378083E−02 | 4.696489E−01 | 5.213669E−01 |
| A10 | −4.034004E−03 | 3.039390E−02 | 1.840005E−02 | 7.566452E−02 | −4.023400E−02 | −4.331358E−01 | −4.680477E−01 |
| A12 | 3.446551E−03 | −1.092454E−02 | −1.215942E−02 | −5.330692E−02 | 1.739122E−02 | 1.992637E−01 | 2.417486E−01 |
| A14 | −8.641725E−04 | 1.482921E−03 | 2.590313E−03 | 1.291094E−02 | −3.348473E−03 | −3.445673E−02 | −6.120298E−02 |
| A16 | 0.000000E+00 | 0.000000E+00 | 0.000000E+00 | 0.000000E+00 | 0.000000E+00 | 0.000000E+00 | 5.741055E−03 |

| | Tenth Surface | Eleventh Surface | Twelfth Surface | Thirteenth Surface | Fourteenth Surface | Fifteenth Surface | Sixteenth Surface |
|---|---|---|---|---|---|---|---|
| k | 0.000000E+00 | 3.145205E+00 | −3.562397E+00 | −3.965832E−01 | −3.481758E+01 | −4.862829E+01 | −3.740797E−01 |
| A4 | −1.731737E−02 | −1.590424E−01 | −3.446364E−01 | −1.573762E−01 | 1.060895E−02 | −2.031755E−01 | −1.791326E−01 |
| A6 | −4.305601E−02 | 1.523575E−01 | 2.995538E−01 | 1.065712E−01 | 8.070143E−02 | 9.269968E−02 | 8.651954E−02 |
| A8 | −2.491983E−02 | −1.056721E−01 | −2.409359E−01 | −8.124638E−02 | −8.004663E−02 | −1.740444E−02 | −3.056213E−02 |
| A10 | 6.550460E−02 | 3.500628E−03 | 1.226143E−01 | 2.657729E−02 | 3.070488E−02 | 8.248714E−04 | 6.776403E−03 |
| A12 | −3.327720E−02 | 3.341165E−02 | −3.461828E−02 | −3.816524E−03 | −5.940645E−03 | 2.359584E−04 | −9.022233E−04 |
| A14 | 4.579027E−03 | −1.598679E−02 | 5.096118E−03 | 2.091134E−04 | 5.815370E−04 | −4.095271E−05 | 6.544312E−05 |
| A16 | 3.368663E−04 | 2.267719E−03 | −3.109615E−04 | −1.506275E−06 | −2.299858E−05 | 1.979074E−06 | −1.991338E−06 |

The imaging lens in Example 7 satisfies conditional expressions (1) to (27) as shown in Table 8.

Figure 14:
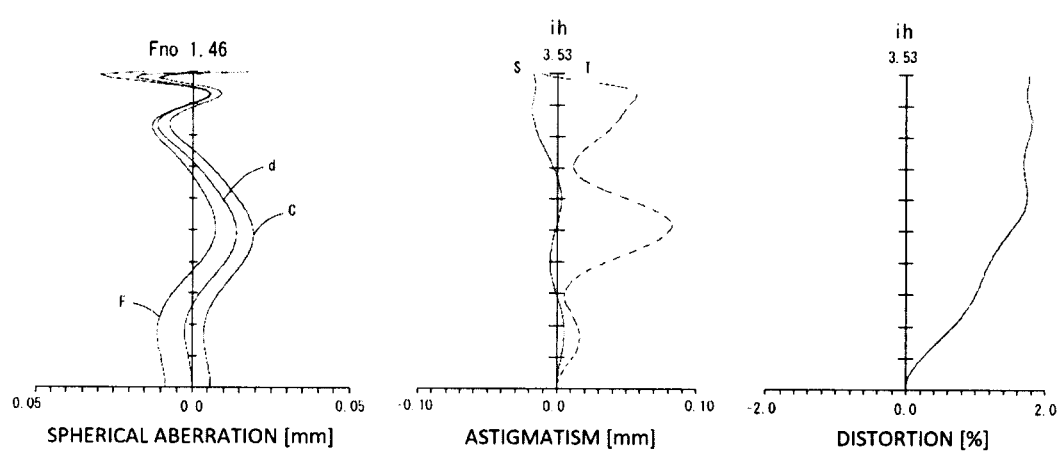
FIG. 14 shows spherical aberration, astigmatism, and distortion of the imaging lens in Example 7 according to the present invention.
Figure 15:
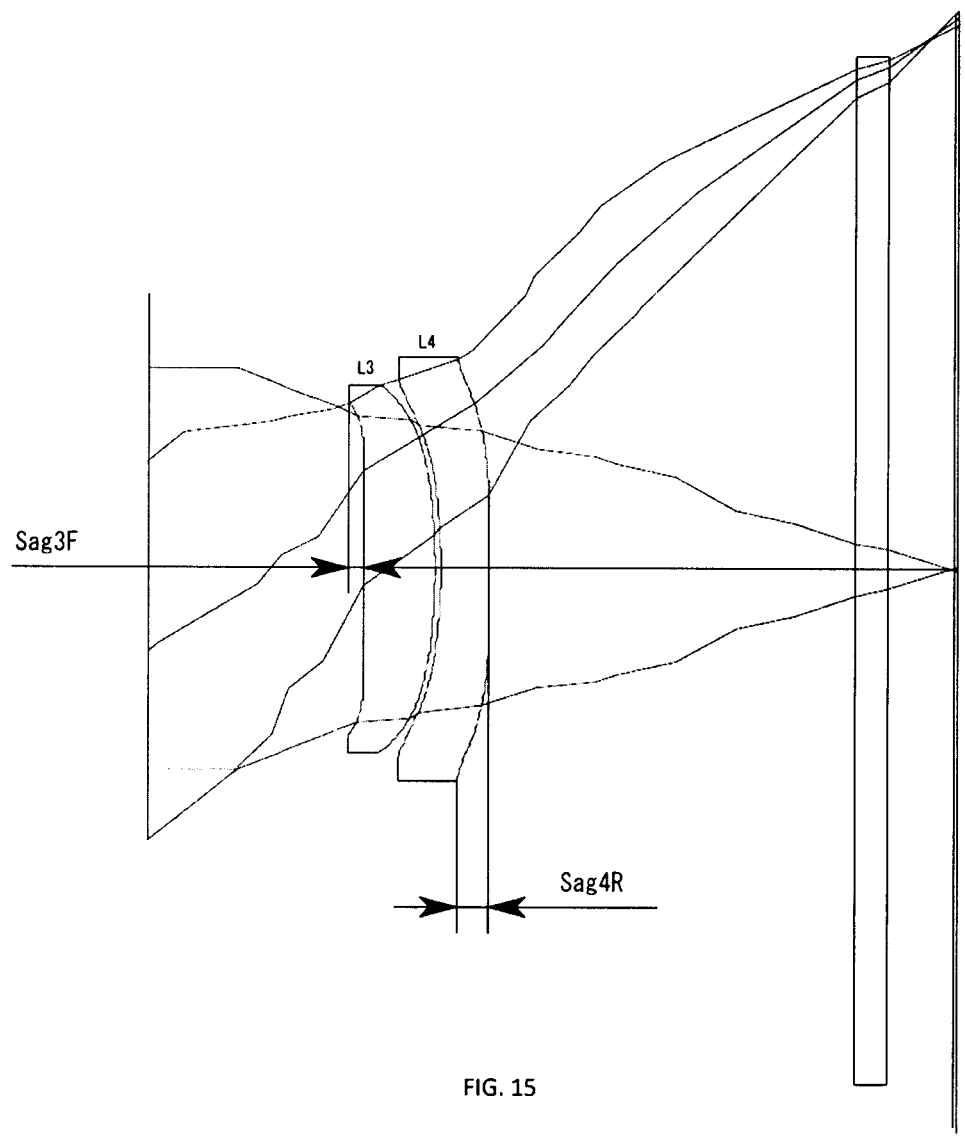
FIG. 15 illustrates an amount of sag 3F at a peripheral area of an effective diameter on an object-side surface of the third lens and an amount of sag 4R at a peripheral area of an effective diameter on an image-side surface of the fourth lens according to the imaging lens of the present invention.

FIG. 14 shows spherical aberration (mm), astigmatism (mm), and distortion (%) of the imaging lens in Example 7. As shown in FIG. 14, each aberration is corrected excellently.

In table 8, values of conditional expressions (1) to (27) related to the Examples 1 to 7 are shown.

TABLE 8

| Conditional Expressions | Example 1 | Example 2 | Example 3 | Example 4 | Example 5 | Example 6 | Example 7 |
|---|---|---|---|---|---|---|---|
| (1) vd3/vd4 | 2.89 | 2.89 | 2.73 | 2.73 | 2.73 | 2.73 | 2.73 |
| (2) T2/T3 | 8.31 | 5.28 | 1.36 | 11.56 | 8.37 | 11.78 | 4.13 |
| (3) Σd/f | 0.97 | 1.03 | 1.05 | 1.02 | 1.00 | 0.99 | 1.05 |
| (4) (D6/TTL) × 100 | 9.77 | 9.97 | 9.46 | 9.95 | 9.80 | 9.89 | 10.03 |
| (5) r1/f | 0.41 | 0.43 | 0.49 | 0.42 | 0.41 | 0.46 | 0.48 |
| (6) r14/f | 0.62 | 0.93 | 0.50 | 0.65 | 0.68 | 0.42 | 0.54 |
| (7) r3/r4 | 1.17 | 1.13 | 1.44 | 0.76 | 0.99 | 1.83 | 1.59 |
| (8) r5/r6 | −5.34 | −6.95 | −0.57 | −70.68 | −483.97 | −3.02 | −0.42 |
| (9) r9/r10 | 4.90 | 2.74 | 1.13 | 2.43 | 3.23 | 3.00 | 2.33 |
| (10) r11/r12 | −1.23 | −0.78 | −0.97 | −0.89 | −0.86 | −0.86 | −0.64 |
| (11) f1/f | 1.15 | 1.17 | 1.23 | 1.44 | 1.21 | 0.86 | 1.03 |
| (12) f3/f | 1.23 | 1.29 | 1.95 | 0.99 | 1.24 | 1.38 | 2.75 |
| (13) f4/f | −1.45 | −1.34 | −2.69 | −0.94 | −1.27 | −1.66 | −2.59 |
| (14) f5/f | −1.11 | −1.30 | −17.14 | −1.53 | −1.14 | −1.15 | −1.56 |
| (15) f6/f | 0.43 | 0.50 | 0.61 | 0.52 | 0.48 | 0.49 | 0.50 |
| (16) f7/f | −0.47 | −0.53 | −0.51 | −0.52 | −0.53 | −0.57 | −0.60 |
| (17) f12/f | 1.25 | 1.23 | 1.76 | 1.13 | 1.15 | 1.32 | 1.44 |
| (18) D5/f | 0.08 | 0.08 | 0.09 | 0.08 | 0.07 | 0.08 | 0.09 |

TABLE 8-continued

| Conditional Expressions | | Example 1 | Example 2 | Example 3 | Example 4 | Example 5 | Example 6 | Example 7 |
|---|---|---|---|---|---|---|---|---|
| (19) | T6/f | 0.08 | 0.11 | 0.09 | 0.10 | 0.09 | 0.08 | 0.11 |
| (20) | (D1/TTL) × 100 | 13.77 | 15.78 | 12.09 | 16.34 | 16.72 | 12.19 | 15.23 |
| (21) | T1/T2 | 0.50 | 0.37 | 0.61 | 0.06 | 0.18 | 0.07 | 0.07 |
| (22) | T3/T4 | 0.11 | 0.23 | 0.88 | 0.13 | 0.15 | 0.11 | 0.40 |
| (23) | r1 < r2 | YES | YES | YES | YES | YES | YES | YES |
| (24) | f6/f7 | −0.91 | −0.94 | −1.20 | −1.00 | −0.90 | −0.86 | −0.83 |
| (25) | \|Sag3F − Sag4R\|/f | 0.03 | 0.03 | 0.09 | 0.02 | 0.02 | 0.02 | 0.03 |
| (26) | TTL/EPD | 2.01 | 1.99 | 2.05 | 2.01 | 2.04 | 2.08 | 1.84 |
| (27) | TTL/ih | 1.46 | 1.46 | 1.59 | 1.47 | 1.50 | 1.49 | 1.58 |

When the imaging lens according to the present invention is adopted to a product with the camera function, there is realized contribution to the wide field of view, the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
L7: seventh lens
ih: maximum image height
IR: filter
IMG: imaging plane
SH: flare stop

What is claimed is:

1. An imaging lens comprising in order from an object side to an image side,
   a first lens with positive refractive power in a paraxial region,
   a second lens with positive refractive power in a paraxial region,
   a third lens with positive refractive power in a paraxial region having an object-side surface being convex and an image-side surface being convex in the paraxial region,
   a fourth lens,
   a fifth lens with negative refractive power in the paraxial region,
   a sixth lens with positive refractive power in the paraxial region, and
   a seventh lens with negative refractive power in the paraxial region having an object-side surface being concave in the paraxial region and an image-side surface that is concave in the paraxial region and is formed as an aspheric surface having at least one pole point in a position off the optical axis,
   wherein the first lens to the seventh lens are single lenses, respectively,
   an object-side surface of the fifth lens is convex in the paraxial region and has at least one pole point in a position off the optical axis, and
   an image-side surface of the fifth lens is concave in the paraxial region and is formed as an aspheric surface having at least one pole point in a position off the optical axis, an object-side surface of the sixth lens is convex and is formed as an aspheric surface having at least one pole point in a position off the optical axis, and an image-side surface of the sixth lens is convex in the paraxial region, and the following conditional expression (1) is satisfied:

$$1.8 < vd3/vd4 < 4.0 \tag{1}$$

where
vd3: an abbe number at d-ray of the third lens, and
vd4: an abbe number at d-ray of the fourth lens.

2. The imaging lens according to claim 1, wherein the first lens is formed in a meniscus shape having an object-side surface being convex in the paraxial region.

3. The imaging lens according to claim 1, wherein the fourth lens has negative refractive power in the paraxial region and has an object-side surface being concave in the paraxial region.

4. The imaging lens according to claim 1, wherein the following conditional expression (2) is satisfied:

$$0.80 < T2/T3 < 15.0 \tag{2}$$

where
T2: a distance along the optical axis from an image-side surface of the second lens to an object-side surface of the third lens, and
T3: a distance along the optical axis from an image-side surface of the third lens to an object-side surface of the fourth lens.

5. The imaging lens according to claim 1, wherein the following conditional expression (3) is satisfied:

$$0.70 < \Sigma d/f < 1.30 \tag{3}$$

where
$\Sigma d$: a distance along the optical axis from an object-side surface of the first lens to an image-side surface of the seventh lens, and
f: a focal length of the overall optical system of the imaging lens.

6. The imaging lens according to claim 1, wherein the following conditional expression (4) is satisfied:

$$6.0 < (D6/TTL) \times 100 < 13.0 \tag{4}$$

where
D6: a thickness of the sixth lens along the optical axis, and
TTL: a total track length.

* * * * *